US012724681B2

(12) United States Patent
Singh

(10) Patent No.: US 12,724,681 B2
(45) Date of Patent: Sep. 1, 2026

(54) TIERED RESILIENCY APPLICATION CONTAINER

(71) Applicant: Chicago Mercantile Exchange Inc., Chicago, IL (US)

(72) Inventor: Inderdeep Singh, Palatine, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 46 days.

(21) Appl. No.: 19/005,384

(22) Filed: Dec. 30, 2024

(65) Prior Publication Data

US 2026/0186927 A1 Jul. 2, 2026

(51) Int. Cl.
*G06F 11/20* (2006.01)
*G06F 11/18* (2006.01)

(52) U.S. Cl.
CPC ........ *G06F 11/2041* (2013.01); *G06F 11/183* (2013.01); *G06F 2201/805* (2013.01)

(58) Field of Classification Search
CPC ..... G06F 11/0709; G06F 11/1629–165; G06F 11/183; G06F 11/184; G06F 11/185; G06F 11/187; G06F 11/202; G06F 11/2041
See application file for complete search history.

(56) References Cited

U.S. PATENT DOCUMENTS

2012/0166390 A1* 6/2012 Merriman ........... G06F 16/2365 707/613
2019/0146884 A1* 5/2019 Gangadharappa .. G06F 11/2094 711/162
2021/0320977 A1* 10/2021 Huang .................. G06F 11/184
2024/0421941 A1 12/2024 Singh

OTHER PUBLICATIONS

Liu et al., "A balanced leader election algorithm based on replica distribution in Kubernetes cluster", 2024, Cluster Computing 27.6, pp. 7241-7250. (Year: 2024).*
"Containers and the Cloud: An Easier Way to Deploy Workloads", Intel, https://www.intel.com/content/www/us/en/cloud-computing/containers.html, downloaded Dec. 30, 2024.
Extended European Search Report in European Patent Application No. 25209556.7, dated Apr. 14, 2026, 11 pages.

* cited by examiner

*Primary Examiner* — Michael Maskulinski
(74) *Attorney, Agent, or Firm* — Lempia Summerfield Katz LLC

(57) ABSTRACT

A system of providing redundancy to a transaction processing application includes a resiliency processor that instantiates at least three instances of a containerized process in a data processing environment, each comprising an instance of the transaction processing application configured to execute transactions received thereby. Each instance of the containerized process coordinates with others of the containerized processes to designate one of the instances of the containerized process as a leader instance and each of the remaining of the containerized processes as a follower instance. The leader instance receives transaction messages to be processed thereby, forwards, prior to processing the received transaction messages, a copy of the one or more transaction messages to each of the follower instances, awaits an acknowledgment message from a majority thereof, and processes the transaction messages only upon receipt of the acknowledgment messages from a majority of the follower instances.

29 Claims, 27 Drawing Sheets

300

First Data Path 350
Instance 302
Third Data Path 354
Transaction Message Source 304
Leader 308
Recipient 318
Second Data Paths 352a
352b
Followers 310
Follower 310a
Follower 310b
Instances 302

Figure 12C:
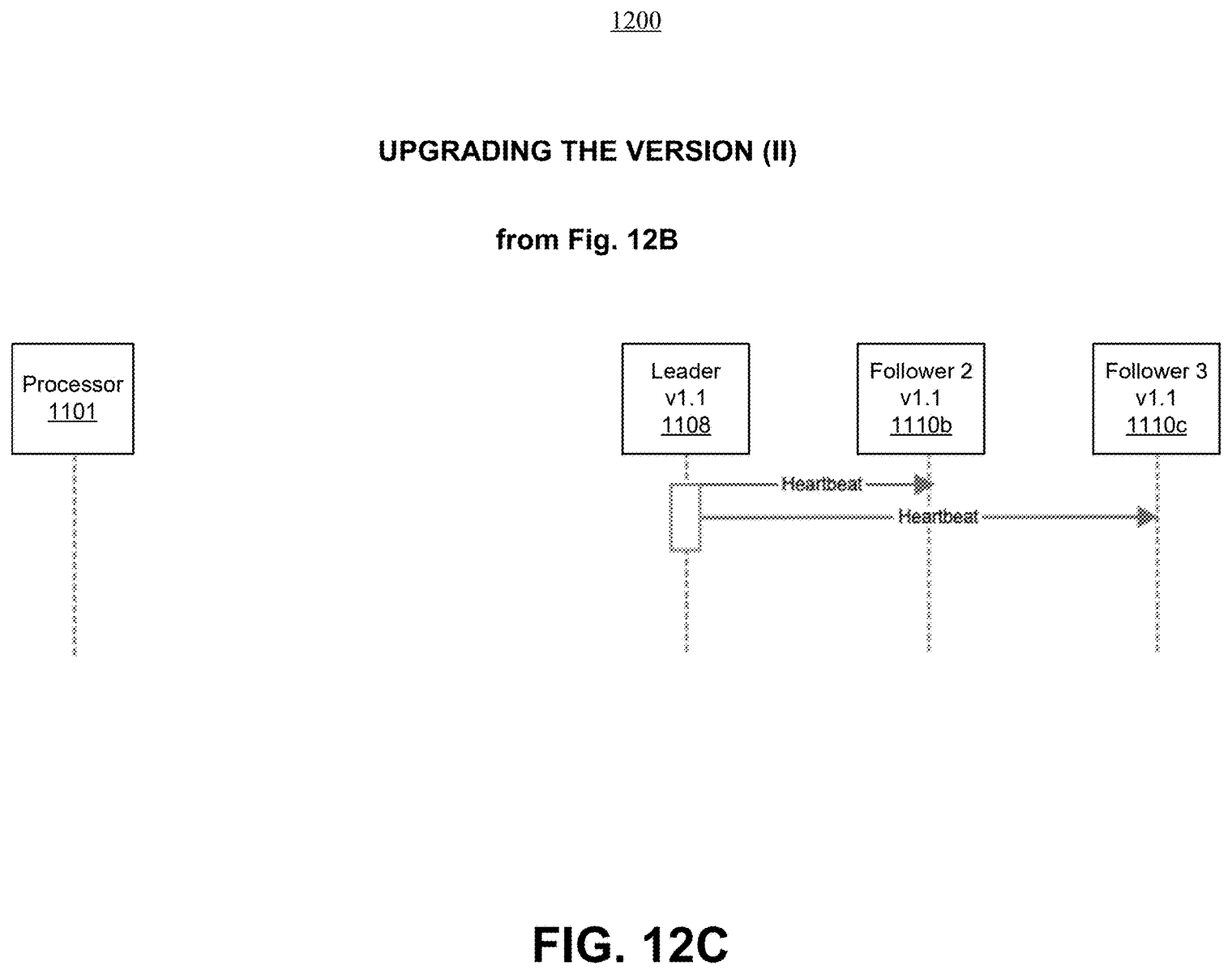

UPGRADING THE VERSION (II)

from Fig. 12B

Processor 1101

Leader v1.1 1108

Follower 2 v1.1 1110b

Follower 3 v1.1 1110c

Heartbeat

Heartbeat

TIERED RESILIENCY APPLICATION CONTAINER

BACKGROUND

Resiliency is the ability of an application or system to recover and continue to operate effectively despite increased workload or disruptions, e.g., infrastructure or service disruptions, i.e., to dynamically acquire computing resources to meet demand, and mitigate disruptions such as natural catastrophes, data center malfunctions, misconfigurations, intermittent service disruptions, operating system failures, network issues, etc. Resiliency may be defined in terms of metrics which measure the acceptable disruption duration or time to recover therefrom, the acceptable amount of data loss, etc, such as Recovery Time Objective (RTO) and Recovery Point Objective (RPO). RTO is the maximum acceptable time delay between the interruption of service and restoration of service that the application can tolerate. RPO is a measure of an acceptable maximum data loss that the application can tolerate.

In particular, RPO may be generally defined as the maximum amount of data—as measured by time or the number of transactions—that can be lost after a recovery from a disaster, failure, or comparable event before data loss will exceed what is acceptable to an organization. An RPO determines, for example, the maximum age of the data or files in backup storage needed to be able to meet the objective specified by the RPO, should a network or computer system failure occur. An organization's loss tolerance, or how much data it can lose without sustaining significant harm, is related to RPO, and may be set forth in the organization's business continuity plan (BCP). This also dictates procedures for disaster recovery (DR) planning, including the acceptable backup interval, because it refers to the last point when the organization's data was preserved in a usable format. For example, an RPO of 60 minutes requires a system backup every 60 minutes. Often, high-priority applications demand tighter RPOs, which will require more frequent backups. For example, an RPO of 0 to 1 hour may be specified for critical operations that cannot afford to lose over an hour of data, i.e., they are dynamic, high volume, and difficult or impossible to recreate due to the number of variables involved. Patient records, banking transactions, and customer relationship management (CRM) systems all may fall within this tier.

In some applications, such as electronic financial trading, electronic commerce and other applications, regulatory requirements may specify or otherwise factor into the degree to which data loss is acceptable. For example, a regulatory agency, such as the Commodity Futures Trading Commission (CFTC), may specify an RPO of 30 seconds for financial transaction processing systems.

In proprietary implementations of an application/system implemented in private data center environments where the operator has full control over the hardware which hosts the application/system, the software used, the geographic locations, etc. of their implementation, the extent of computing resources deployed may be managed and latency issues may be mitigated/accounted for in devising an acceptable disaster recovery plan designed to minimize recovery/down time and mitigate, if not eliminate, potential data loss.

However, shared, or multi-tenant implementations, sometimes referred to as "cloud" based environments, deployments, or implementations, are now becoming more prevalent, where computing resources are operated by a third-party vendor, remotely located, and offered as a service, such as via virtual computing systems, e.g. host machines, which "host" the operator's application/system. Such services are advantageous as they can mitigate the cost of operating a proprietary data center: such as real estate, utility and staffing costs; they can provide additional computing resources dynamically/on demand, such as at peak load times; they offer additional computing resources to ensure reliability, availability and serviceability; and they often operate multiple geographically disparate data centers offering reduced latency to customers located in different geographic regions and/or increased redundancy/resiliency, and the like. A region may refer to an independent geographic area that consists of multiple zones, which may be referred to as computing zones. A zone may include a deployment area for resources within a region and each zone may represent a single failure domain within a region.

However, such advantages do not come without costs, e.g., a significant reduction in the ability of a customer/operator to control the hardware, software, and geographic locations of their application/system being hosted, as well as the backup systems therefore. For example, as the actual computing resources provided by the service are often shared with other customers, the overall processing loads on those resources may vary dynamically, both between different computing resources and over time, resulting in applications not being able to control the amount of shared resources consumed by the workloads of other applications or tenants.

Furthermore, cloud based environments may rely on the public network infrastructure for connectivity, e.g., an internet connection. With cloud computing, a faulty internet connection may keep users from accessing information or applications. Even top cloud service providers may experience downtime due to a natural disaster or slower performance caused by an unforeseen technical issue, such as a disruption to an undersea cable, that may impact connectivity. Users may be blocked from accessing cloud services until the problem is resolved.

Further, the cloud environment is dynamic and includes a shared infrastructure over different geographical zones and regions that includes various elements of software below the application layer that manage the scheduling of network, network, memory, CPU time, and I/O available to the application. The shared infrastructure, e.g., Infrastructure as a Service (IaaS), provides essential computing, storage, and networking resources on demand. In particular, the shared infrastructure offers virtual machines (VMs) or virtual server instances that are hosted by one or more host computers, scalable storage solutions, and network components such as virtual networks, load balancers, and firewalls. VMs are stand-alone computing environments that are abstracted from hardware. The shared infrastructure may further provide a hypervisor or virtual machine monitor which includes software, firmware or hardware that creates and runs the VMs. The hypervisor may be executed by a host machine and enables the host machine to support multiple guest VMs by virtually sharing the host machine hardware's resources such as memory and processing. Further, an IaaS cluster configuration may be provided in which multiple VMs form a failover cluster and work together to provide high availability.

In cloud environments, slight latency and packet delays are common when relying on a VM server. Further, VMs require a full replica of an operating system (OS) to function. VMs offer some advantages as they can be used to simulate a different OS from the host system. For example, even though a host machine runs Windows, it is possible to run a Linux OS in a VM, and vice versa. VMs also allow for even more isolation and data security, being more fully insulated systems of compute. However, because VMs are essentially self-contained systems with their own OS, VMs may take a long time to boot, and they may run less efficiently.

Further, since cloud environments allow for multiple tenants in the same VM server, a resource-heavy system/application implemented on a given server may impact other applications running on that same server which may experience performance issues, e.g., due to contention for resources. Therefore, applications installed in cloud environments are not necessarily able to guarantee or control the portions of shared resources available to them due to the consumption thereof by other applications or tenants.

Third party vendors/cloud providers may offer service level agreements, including native backup system/disaster recovery solutions, but, owing to the nature of a cloud service as having to be able to cost-effectively service many customers with substantially varying needs, such solutions are often necessarily generic in their implementation and require compromises on the part of customers in terms of wider acceptable latency variations, increases in the amount of acceptable data loss in failure situations, increased down time, and the like.

Third party vendors/cloud providers also perform platform maintenance activities in cloud environments to keep the machine hosts healthy, such as installation of critical security patches or upgrading hardware, infrastructure, or services. These maintenance tasks may also consume some of the resources of the systems on which tenant applications are running, resulting in a reduction, temporary or permanent depending on the nature of the maintenance, in the resources allocated thereto. In addition, sometimes a service upgrade or maintenance results in multi-region outages. Therefore, there may be occasions in which providing performance consistency is challenging due to, for example, a regional service outage which encompasses a complex event that is out of the control of the applications.

Since the hardware infrastructure is implemented in the cloud, applications may not have the ability to detect hardware degradation in advance so as to be able to take remedial actions before a severe hardware fault or failure happens.

One of the key advantages of the cloud, however, is the elastic nature of the infrastructure provided thereby that enables dynamic deployment of additional computational resources and continuous delivery of upgrades to the application and to run multiple parallel versions of the applications and switch between them to perform version upgrades in a seamless manner to the customer. However, the switchover may vary from small and seamless to disruptive both in terms of the performance glitches when switching over as well as undiscovered bugs that arise from quick cycles in agile delivery models. Bugs should be rolled back seamlessly and without impact to the customer.

As different applications and systems may be sharing the same hardware infrastructure, it is desirable for applications to be able to accommodate increases in demand as well as handle external factors such as cloud platform maintenance events, intermittent service disruptions, hardware failures, or auto scaling events that may be induced, for example, by multitenant applications that may force a pause on each application's process to ensure critical platform management tasks.

Accordingly, it is desirable to provide a system/application architecture specifically configured to ensure consistent performance, resiliency, and to enable continuous delivery of system/application upgrades over different geographical zones and regions in a multitenant infrastructure.

BRIEF DESCRIPTION OF THE DRAWINGS

FIGS. 12A, 12B, and 12C depict sequence diagrams of an upgrading version sequence in an application container system according to some embodiments.

DETAILED DESCRIPTION

Figure 1:
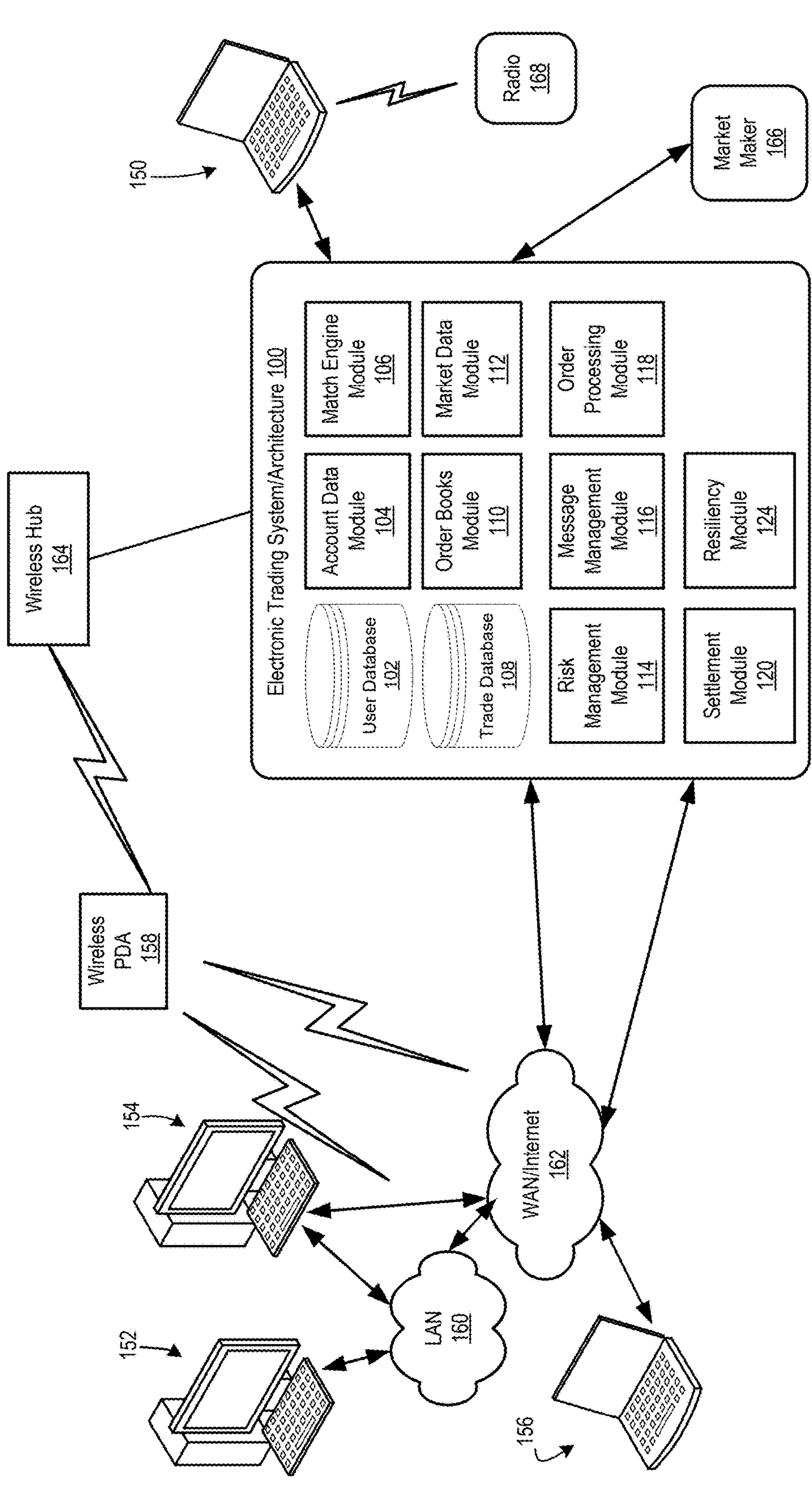
FIG. 1 depicts a computer network system, according to some embodiments.

The disclosed embodiments relate to a system/process which implements specifically configured instances of a containerized process in a data processing environment and that provides redundancy to achieve resiliency, consistent performance, and continuous delivery to a transaction processing application that executes one or more transactions received from one or more transaction message sources. Each instance of the containerized process is specifically configured to designate one of the instances of the containerized process as a leader instance and each of the remaining of the containerized processes as a follower instance, each of which is able to take over for the leader instance should the leader instance fail or otherwise be unable to operate as expected. The leader instance is specifically configured to process the transactions only upon receipt of acknowledgement messages from a majority of follower instances, ensuring sufficient, per a requisite level of redundancy, follower instances are available and ready to take over in case of a failure of the leader instance or which compromises the leader instance's ability to operate as expected.

A container is an abstract unit of software that is a stand-alone, executable unit that has everything needed to run an application, e.g., code, runtime, system tools, and system libraries. In particular, containerization is a software deployment process that bundles an application's code with all the files and libraries it needs to run on any infrastructure.

Containers have defined parameters and can run a program, a workload, or a specific task. Similar to VMs, containers are stand-alone computing environments. However, as noted above, because VMs are essentially self-contained systems with their own OS, VMs may take a long time to boot, and they may run less efficiently.

Containerization is similar to but improves the concept of a VM. For example, instead of copying the hardware layer, containerization removes the operating system layer from the self-contained environment. This allows the application to run independently from the host operating system. Containerization prevents resource waste because applications are provided with the exact resources they need. Containerization involves building self-sufficient software packages that perform consistently, regardless of the machines they run on.

The disclosed embodiments provide at least three instances of an improved containerized process that are arranged in a specific configuration to be deployed together or separately, logically and/or physically/geographically, anywhere across multiple systems or cloud infrastructures in a data processing environment and that provide resiliency, enhanced portability, scalability, fault tolerance, and agility.

In particular, the disclosed containers provide enhanced portability by enabling deployment of processing applications in multiple environments without rewriting the program code. A processing application may be built once and deployed on multiple operating systems. For example, the same containers may be deployed on Linux and Windows operating systems. Legacy application code may be upgraded to modern versions using containers for deployment.

The disclosed instances of a containerized process provide scalability since the containers are lightweight software components that run efficiently. For example, a VM can launch a containerized application faster because it doesn't need to boot an operating system. Therefore, multiple containers may be added in a cluster for different applications on a single machine. The container cluster uses computing resources from the same shared operating system, but one container does not interfere with the operation of other containers.

The disclosed containers enable building fault-tolerant applications. Multiple containers may be used to run microservices on the cloud. Because containerized microservices operate in isolated user spaces, a single faulty container doesn't affect the other containers. This increases the resilience and availability of the application.

Containerized applications provide agility, i.e., flexibility, balance, adaptability, and coordination, since they can be run in isolated computing environments. The application code may be troubleshot and changed without interfering with the operating system, hardware, or other application services. Software release cycles may be shortened, and updates may be worked on quickly with the container model.

As will be discussed, the disclosed embodiments relate to a tiered resiliency container architecture that includes multiple instances of a containerized process, each of which implements an application. Each instance is implemented and specifically configured to perform all (e.g., for resiliency, continuous delivery, and consistent performance) or some (e.g., for, testing, bug detection, and recovery) of the same tasks.

The disclosed embodiments provide an architecture that addresses technical problems including intermittent service disruptions or degradations, in the cloud and/or on premise, seamlessly across different tiers and different regions. The disclosed architecture is specifically configured to provide redundancy to achieve resiliency and to adapt on the fly with zero downtime deployment.

The disclosed embodiments provide a tiered resiliency container architecture to abstract away resilience and distributed state management aspects of applications to simplify the development of applications in the cloud. In particular, the disclosed embodiments provide a technical solution configured to seamlessly handle intermittent service disruptions or degradations in the cloud, deliver intra-zone, multi-zone and multi-regional resilience with no impact to application architecture, adapt to focus on resilience versus performance dynamically based on platform health, e.g., to keep the application running, support zero downtime deployment (ZDT), and allow for testing in production with production data in parallel with the production workload.

The disclosed embodiments provide improved performance consistency, determinism, and resiliency and may control or define the RPO and/or RTO as required by the application implementation. Further, the disclosed embodiments provide automated intra-zonal, multi-zonal and multi-regional service to handle application failure and recovery in line.

As will be described in greater detail below, generally, the disclosed embodiments implement a resilient processing architecture in which an application is deployed using multiple specifically configured containers, where each container is executing an instance of the application and one container is designated as the leader, the others being designated as followers and which provide redundancy should the leader container fail. The leader is configured to allow its application instance to process incoming transactions, and generate outputs to recipients, etc., as required/defined by the application. Each of the followers also receive the incoming transactions and process those transactions to at least the extent so as to be ready to take over for the leader should the leader fail. Each of the leader and followers may be implemented in different computing zones and/or geographic regions as dictated by the implementation and desired degree of resilience. In the disclosed embodiments, in order to ensure resiliency, the leader container only allows its application instance to process a given transaction if a majority (50%+1), also referred to as a consensus, of followers are presently operating correctly and thereby ready to take over, as determined by receipt, by the leader instance, of an acknowledgment message from a majority of the followers that they have received and processed, to the necessary, extent, the given pending transaction(s). Accordingly, this defines a minimum number of containers at three, one leader and two followers where, in this implementation, both followers, i.e., the majority, must be operational for the leader to operate. Dependent upon the deployment and the defined level of required resiliency, additional intra or inter-zone or intra or inter-regional followers may be deployed with the number of operational followers needed for consensus automatically adjusting based thereon.

As will be appreciated, in the disclosed architecture, the performance of the application is dependent upon the slowest follower instance in the consensus group, i.e., receipt of the last of a majority of the acknowledgment messages. Where a consensus of follower instances are all located in the same region as the leader instance, application performance may be high as the latency in communicating messages to, and receiving acknowledgements from, the consensus of followers may be low. Where one or more follower instances of the consensus group are located in a different region, or otherwise, where the communications latency between those follower instances and the leader instance is high, performance may be degraded but the application remains operational. It will be appreciated that the disclosed architecture may adapt to maintain operation of the application. For example, in one deployment of the disclosed architecture, the leader instance and a consensus of follower instances may be deployed in a single local region, ensuring application performance due to low latency therebetween, while additional follower instances are deployed in another remote region to ensure inter-regional resilience, albeit with a higher communication latency with the leader instance. During normal operations, the additional remote follower instances will not degrade application performance as the leader instance is not dependent upon receiving acknowledgments therefrom in order to achieve the requisite consensus. However, should one of the local follower instances fail, the leader instance will automatically/naturally begin to depend on receiving an acknowledgment from one of the remote follower instances in order to achieve consensus and the added latency will degrade application performance to the added delay in receiving the acknowledgment message, but the application will continue to operate. Once the failed follower instance is replaced with another local instance, application performance will naturally return to normal as this new follower instance begins to send its acknowledgements and consensus is again dependent entirely upon local follower instances. In this manner, the disclosed architecture automatically adapts to failure scenarios, maintaining application operation during failures and automatically restoring performance once the failure is resolved.

An example of systems which may be implemented with the disclosed embodiments are the different applications, i.e., components or modules, which are used to implement the operations of an electronic transaction processing system, such as an electronic trading system. The disclosed embodiments may be particularly useful for providing resiliency to those applications which do not require ultra-low latency or an RPO/RTO of zero.

A financial instrument trading system or a transaction processing system, such as a futures exchange, referred to herein also as an “Exchange”, such as the Chicago Mercantile Exchange Inc. (CME), provides a contract market where financial instruments, for example futures, options on futures and spread contracts, are traded among market participants, e.g., traders, brokers, etc.

As will be described in more detail with respect to FIG. 1, current financial instrument trading systems allow traders to submit orders and receive confirmations, market data, and other information electronically via a communications network. These “electronic” marketplaces, implemented by, and also referred to as, “electronic trading systems,” are an alternative trading forum to pit based trading systems whereby the traders, or their representatives, all physically stand in a designated location, i.e., a trading pit, and trade with each other via oral and visual/hand based communication.

Typically, the Exchange provides for centralized “clearing” by which all trades are confirmed and matched, and open positions are settled each day until expired (such as in the case of an option), offset or delivered. Matching, which is a function typically performed by the Exchange, is a process, for a given order which specifies a desire to buy or sell a quantity of a particular instrument at a particular price, of seeking/identifying one or more wholly or partially, with respect to quantity, satisfying counter orders thereto, e.g. a sell counter to an order to buy, or vice versa, for the same instrument at the same, or sometimes better, price (but not necessarily the same quantity), which are then paired for execution to complete a trade between the respective market participants (via the Exchange) and at least partially satisfy the desired quantity of one or both of the order and/or the counter order, with any residual unsatisfied quantity left to await another suitable counter order, referred to as “resting.”

In particular, electronic trading of financial instruments, such as futures contracts, is conducted by market participants sending trading orders, such as to buy or sell one or more futures contracts, in electronic form to the Exchange. These electronically submitted orders to buy, and sell are then matched, if possible, by the Exchange, i.e., by the Exchange’s Transaction Processor (TP), also referred to as a match engine or matching engine, to execute a trade, with the results thereof being communicated to the market participants through electronic notifications/broadcasts, referred to as market data feeds. Outstanding (unmatched, wholly unsatisfied/unfilled, or partially satisfied/filled) orders are maintained in one or more data structures or databases referred to as “order books,” such orders being referred to as “resting,” and made visible, i.e., their availability for trading is advertised, to the market participants through the electronic notifications/broadcasts, i.e., market data feeds, as well. An order book is typically maintained for each product, e.g., instrument, traded on the electronic trading system and generally defines or otherwise represents the state of the electronic trading system and of the market for that product, i.e., the current prices at which the market participants are willing buy or sell that product. As such, as used herein, an order book for a product may also be referred to as a market for that product.

A market data feed, referred to as market data or market feed, is a compressed or uncompressed real time (with respect to market events), or substantial approximation thereof, electronic data/message stream provided via an electronic communications network, such as the Internet, by the Exchange directly, or via a third party intermediary. A market data feed may be comprised of individual electronic messages, each comprising one or more packets or datagrams, and may carry, for example, pricing or other information regarding orders placed, traded instruments and other market information, such as summary values and statistical values, or combinations thereof, and may be transmitted, e.g., multi-casted, to the market participants using standardized protocols, such as UDP over Ethernet. More than one market data feed, each, for example, carrying different information, may be provided. The standard protocol that is typically utilized for the transmission of market data feeds is the Financial Information Exchange (FIX) protocol Adapted for Streaming (FAST), aka FIX/FAST, which is used by multiple exchanges to distribute their market data. Pricing information conveyed by the market data feed may include the prices, or changes thereto, of resting orders, prices at which particular orders were recently traded, or other information representative of the state of the market or changes therein. Separate, directed/private, messages may also be transmitted directly to market participants to confirm receipt of orders, cancellation of orders and otherwise provide acknowledgment or notification of matching and other events relevant, or otherwise privy, only to the particular market participant.

The GLOBEX® electronic trading system, offered by CME implements an electronic trading system/marketplace for trading futures and options (option contracts), referred to as Exchange Traded Derivative (ETD) options, on futures wherein the underlying is a futures contract for a particular underlier. They are listed and traded by Strike price and Expiry (daily, weekly, monthly, quarterly). ETD options physically expire into, i.e., upon expiration the contract delivers, the closest expiring future contract (typically a highly liquid, if not the most liquid, future contract) for the particular underlier, e.g., in the case of an ETD FX option, it is the closest quarterly expiring future contract. Then the futures contract is settled physically or via cash.

In particular, GLOBEX® is an open access marketplace that allows participants to directly enter their own trades and participate in the trading process, including viewing the book of orders and real-time price data. GLOBEX® has a number of core components/applications/engines or components including a transaction receiver processor (TR), e.g., a market segment gateway, a transaction processor (TP), e.g., a matching engine, a result generator (RG), e.g., a market data generator, and a transaction logger (TL) which includes a database that stores records for transactions for reporting, audit and historical purposes, each of which, in prior implementations, may be deployed in a distributed fashion, e.g., on different inter-networked physical servers. These components may be integrated, e.g., into a single system/transaction processing server instance or tightly coupled set thereof.

The following sequence describes how, at least in part, information may be propagated in an electronic trading system such as GLOBEX®, through a series of electronic messages, and how orders may be processed:

(1) An opportunity is created at the TP, such as by placing a recently received but unmatched order on the order book to rest indicating a trader willing to trade a particular quantity at a particular price, i.e., an opportunity for another trader to trade therewith;

(2) The TP creates an update reflecting the opportunity and sends it to the RG via the network;

(3) The RG generates market data message based on the update and transmits it, e.g., using multicasting, or multiple unicast streams, or other mode of broadcasting via the network, the generated market data message to all of the market participants to advertise the opportunity to trade, i.e., transmits a broadcast market data feed message;

(4) The market participants evaluate the opportunity and each, upon completion of their evaluation, may or may not choose to respond with an order, i.e., a message containing their counter-order, responsive to the resting order, i.e., counter to the resting order for some or all of the available quantity, by transmitting the counter-order via the network to the TR;

(5) The TR receives any counter orders generated by the market participants, ascribes an ordering to each received order relative to the other received orders, sends confirmation of receipt back directly to each submitting market participant, and forwards the received orders to the TP via the network;

(6) The TP evaluates the received orders and matches, using for example, a price/time priority algorithm, the first suitable arriving order, based on the ascribed ordering, against the resting opportunity and a trade is executed. Depending upon the available quantity of the resting order and the quantity of the incoming order, one of the resting order or the incoming order may be fully satisfied with any remainder of either order being placed on the order book to rest, or cancelled, etc.

(7) The TP creates an update and sends it to the RG via the network.

(8) The RG generates a market data message based on the update and transmits the generated market data message to all of the market participants via the network.

The disclosed embodiments may be used to resiliently implement one or more of the functional applications/components/modules of the electronic trading system, such as the clearing function or market data function. Each application/component may receive, and process transaction messages received from other applications/components and generate results based thereon, e.g., trade orders to be cleared, matching results to be formed into messages and communicated to participants, data to be stored in log databases, trade results for margin calculations, etc. Each of these applications may be implemented by a set of resilient containers as described herein.

The disclosed embodiments provide resiliency and redundancy by instantiating at least three instances of a containerized process, i.e., to provide for a leader instance and a 50%+1 consensus of follower instances. Each instance may comprise an instance of a transaction processing application, e.g., a functional application/component/module of the electronic trading system as described above, configured to execute transactions thereby. Each instance may be configured to coordinate with the others of the containerized processes to designate one of the instances of the containerized process as a leader instance/leader and each remaining of the containerized processes as a follower instance/follower.

The leader instance may be configured to receive transaction messages, e.g., electronic transaction messages to clear trades, determine risk, or to perform margin calculations, via an electronic communications network from a transaction message source. The leader instance may forward, e.g., substantially simultaneously communicate/transmit, a copy of the one or more transaction messages to each of the follower instances and which may be intended to be redundant to each other. The leader instance may then await an acknowledgement message from each of a majority of the follower instances. The acknowledgment message may be indicative of the follower instances having at least acknowledged that the one or more transaction messages will be processed by the leader instance. The leader instance may process the one or more transaction messages only upon receipt of the acknowledgement messages from a majority of the follower instances.

Since only one instance, i.e., the leader instance, is outputting transaction messages at any one time, the disclosed embodiments provide application level redundancy. The follower instances "know" they are redundant, i.e., they may be suitably programmed/configured to operate in a redundant mode, and therefore, they do not attempt to generate outputs. In one implementation, the containerized process itself is configured to operate either in leader or follower mode whereas the transaction processing application of each instance operates the same regardless. Alternatively, the transaction processing application of each instance is also configured to operate according to its current role in the data processing environment.

Figure 5:
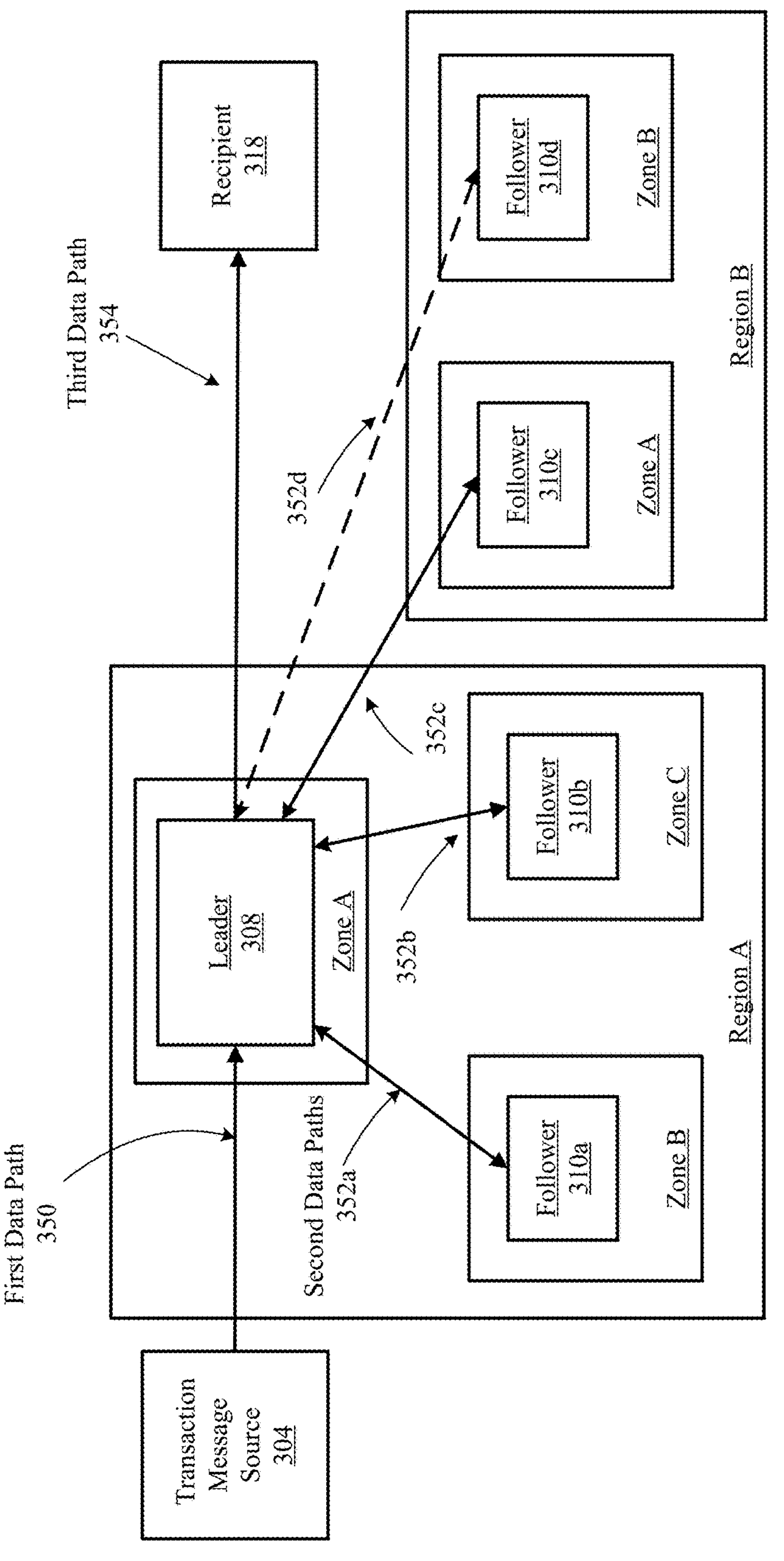
FIG. 5 depicts a logical diagram of an implementation of the disclosed resilient architecture according to some embodiments.
Figure 13:
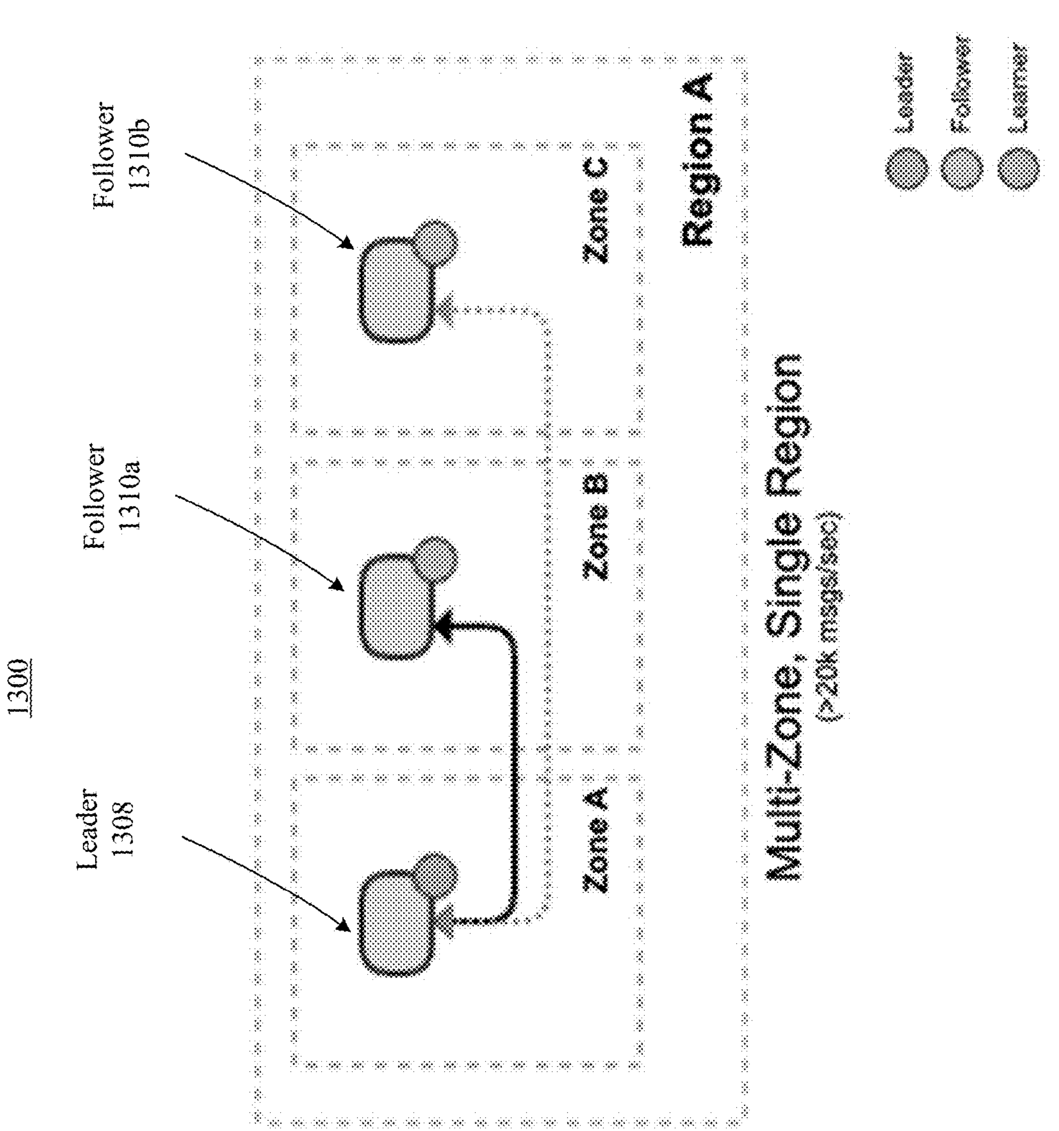
FIG. 13 depicts a block diagram of a system for providing redundancy according to some embodiments.
Figure 15:
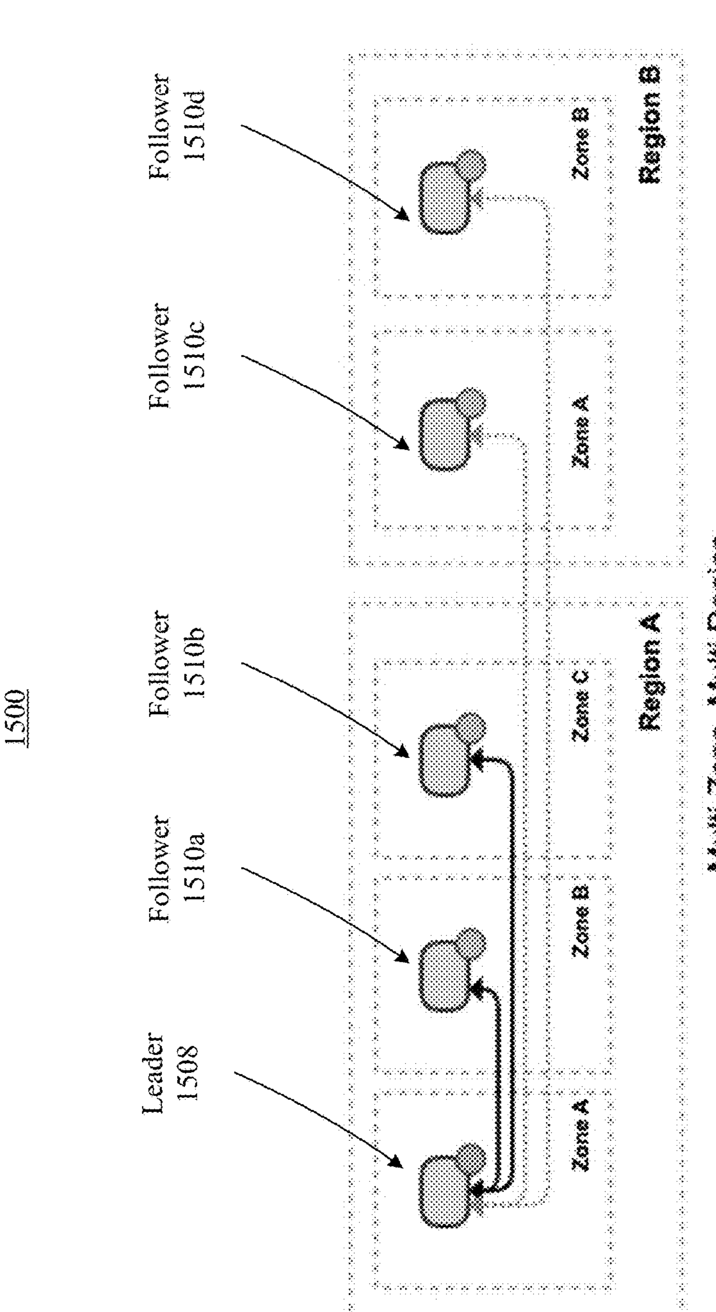
FIG. 15 depicts a block diagram of a system for providing redundancy according to some embodiments.
Figure 15:
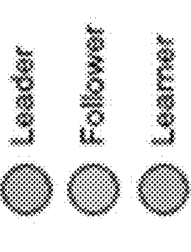
Figure 16:
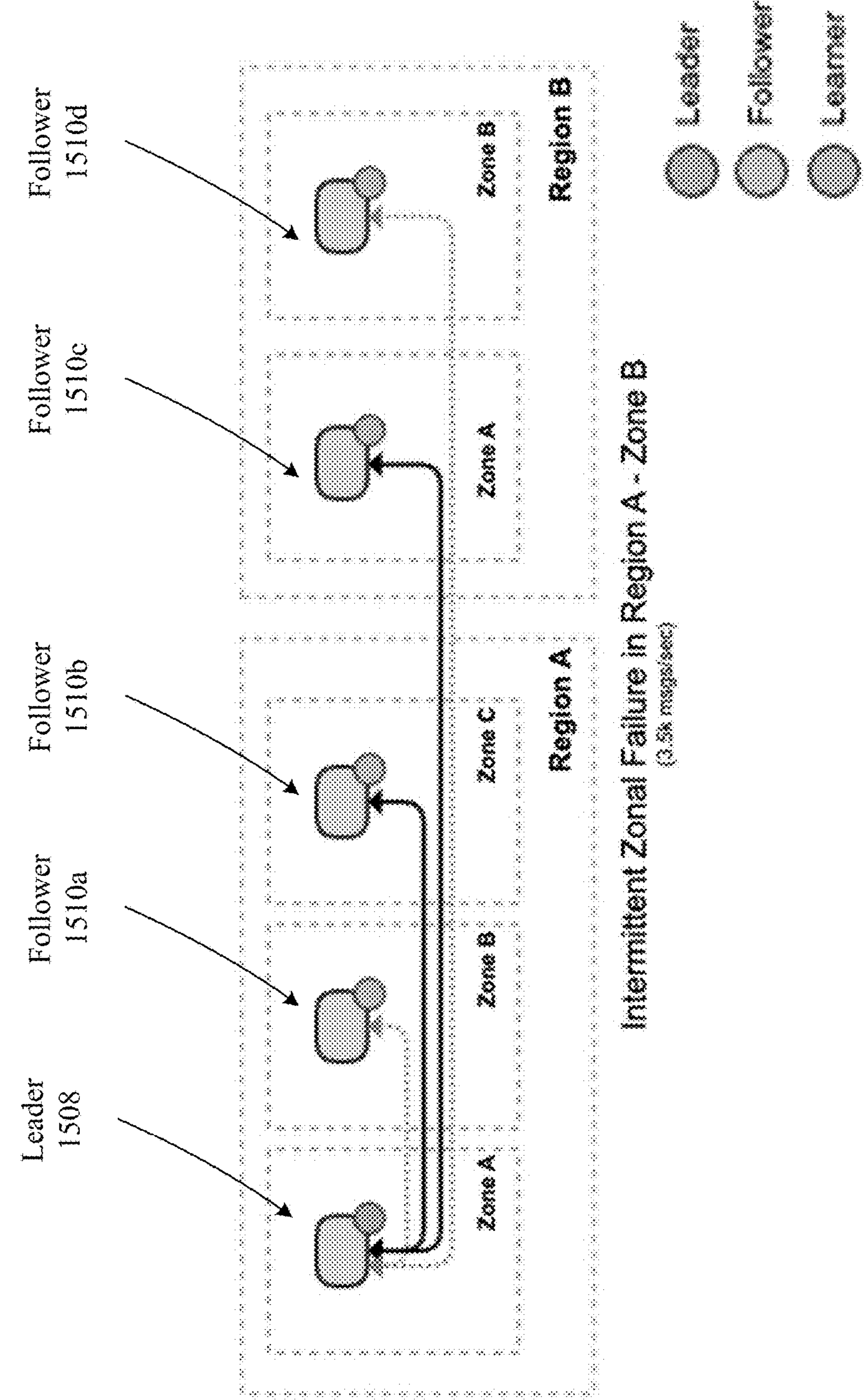
FIG. 16 depicts a block diagram of a system for providing redundancy according to some embodiments.

In some embodiments, as shown in FIG. 13, the leader instance and the follower instances may be instantiated in different computing zones within the same geographic region such as in different servers, different server racks, or different areas of the data center building, etc. In other embodiments, as shown in FIGS. 5, 15, and 16, follower instances may be instantiated in one or more different geographic regions.

In general, if the acknowledgement message of a follower takes longer to reach the leader due to the various external forces mentioned above or the follower fails due to a hardware/service/zone/region failure, its output will not make it to the leader instance before a consensus of acknowledgements is received from other followers. This feature may enable a seamless delivery of performance consistency and resiliency at the same time. The fastest instances will deliver the acknowledgment message first and so any abrupt hindrances will be overcome by the architecture thus delivering consistent performance. Instances in secondary zones/regions may always fall behind for the final decision but when the faster zone or region fails, the slower instances will be available to still deliver the acknowledgement message. Therefore, a tiered resilience is achieved via the instance layout.

In one implementation, the disclosed embodiments may instantiate at least one learner instance which may comprise an instance of another transaction processing application configured to execute transactions received thereby, such as modified/updated version of the application being tested as will be described. The at least one learner instance may be configured to receive the copy of the one or more transaction messages from the leader. In some embodiments, the at least one learner instance is configured to generate an acknowledgement message. In some embodiments, the at least one learner instance is configured to transmit the acknowledgement to the leader instance. In other embodiments, the at least one learner instance is configured not to transmit the acknowledgement message to the leader instance. Nevertheless, the leader instance is specifically configured to require acknowledgement messages from a majority of follower instances. Therefore, any acknowledgment message received from any learner instance is ignored and does not count toward the requisite consensus, even if the acknowledgment message is transmitted to the leader instance.

In one implementation, the disclosed embodiments may instantiate the instances of the containerized process on demand and as needed within a region as well as across regions to address performance variations and failures and to replace, augment, and compensate for slower, operationally compromised and/or failed containers. In particular, the disclosed embodiments may address resiliency by replacing failed, compromised or slower instances of the containerized process. Further, the disclosed embodiments may deploy updates/modifications using continuous and rolling deployment of multiple instances and address performance variations across different servers and regions.

The disclosed embodiments may be implemented in different architectures and configurations to achieve different goals. In some embodiments, to achieve a performance goal, a leader instance and at least two follower instances deployed on different resources may be needed. A consensus cluster may refer to a set of at least three instances of a containerized process, i.e., a leader and two followers. In some embodiments, to address fault tolerance, consensus clusters including follower instances may be located within a zone, e.g., follower instances, or region or across different zones or regions, e.g., follower instances.

In other embodiments, to provide continuous delivery of upgrades to the system, multiple instances of different versions, e.g., learner instances may be instantiated, each comprising the instance of a modified version of the transaction processing application. These embodiments may be combined to create a system which maintains operational performance while providing fault tolerance and enabling continuous delivery of upgrades to the system. For example, as further explained below, using multiple local and geographically distributed clusters of redundant instances may ensure uninterrupted availability by relying on multiple arrays/set/clusters of instances to ensure reception of a processing result from at least one thereof.

The provision of redundant instances for a transaction processing application provides resilience improvements and distributed state management aspects of the applications to simplify the development of applications in a cloud environment. As such, the disclosed embodiments provide technical solutions to these technical problems.

The disclosed embodiments provide an improved system redundancy mechanism for a transaction processing system which can adaptively accommodate temporary and chronic processing and communications latencies and disruptions, particularly in a cloud/shared resource deployment, to mitigate interruptions and performance impact and therefore provide a specific and practical application which improves upon prior transaction processing applications and provides additional functionality not previously provided.

In particular, the disclosed embodiments solve problems which uniquely arise in the fields of computer technology, electronic communication, and transaction processing. The disclosed embodiments are rooted in computer technology in order to overcome problems specifically arising in computer systems. For example, the disclosed embodiments handle technical problems in cloud environments which may experience intermittent service disruptions, e.g., the availability of a cloud service may fail intermittently due to hardware, software or communications problems. Further, other technical problems may include, for example, a full zone or a full region in a cloud environment that may fail. The disclosed embodiments provide redundant instances to handle intermittent failures with no manual intervention.

The disclosed embodiments utilize the same architecture for any tier of resilience and adapt to focus on resilience versus performance. In particular, the disclosed embodiments provide improvements on performance and then adapt to deliver resilience based on the nature of failures on the platform or based on whether the application is being upgraded to a new version. Therefore, when new versions of the application are being deployed, the resilience/performance profile of the application may be affected.

The disclosed embodiments provide tiered resiliency based on the layout of the different instances of the containerized process, and different tiers of performance and resiliency.

The disclosed embodiments further provide runtime configurability by providing the ability to add or remove instances, e.g., when a failure takes place, e.g., by adding follower instances or learner instances on the fly at runtime.

The disclosed embodiments further provide distributed state management. For example, before the leader instance continues to process a received transaction message and transmit a generated result, the system has already synchronized with a consensus cluster before the result is delivered for use, e.g., the leader instance must receive an acknowledgement message by a majority of follower instances before processing the transaction message and transmitting a generated result.

The disclosed embodiments provide a microservice architecture that deliver independent services that focus on specific capabilities. The services may be deployed and scaled independently providing agility and flexibility. In some implementations, the microservice architecture may be implemented using a Google remote procedure call (gRPC) for communication that follows all the patterns needed in the cloud environment to adhere to a microservices architecture. Therefore, there is no middleware involved.

Indeed, the subject technology improves the functioning of the computer by, for example, using intra and inter-region redundant sets/arrays/clusters of instances of a container application to address failures, e.g., operating system failures, that may occur in computer systems by providing a leader instance and follower instances. Further, the disclosed embodiments provide zero downtime deployment of new versions by instantiating learner instances to migrate the leader instance and the follower instances to a new version of the transaction processing application.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of exchanging clearing related messages. The disclosed embodiments may also be used for any cloud hosted application to provide intra-zone, multi-zone and multi-regional resiliency with no impact to application architecture.

Computing Environment

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature, such as clearing firm or clearing entity, reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing electronic trading systems and methods, including the functions of the clearing house described above, is shown in FIG. 1. In particular, FIG. 1 shows the core functions and modules of an electronic trading system 100, which, as will be described below, may be deployed in accordance with the disclosed embodiments. Any one or more of these functions, any one or more subsets of these functions or all of these functions may be implemented using the disclosed embodiments.

The exchange computer system 100 receives messages that include orders and transmits market data related to orders and trades to users, such as via wide area network 162 and/or local area network 160 and computer devices 150, 152, 154, 156 and 158, as described herein, coupled with the exchange computer system/electronic trading system 100.

Herein, the phrase "coupled with" is defined to mean directly connected to or indirectly connected through one or more intermediate components. Such intermediate components may include both hardware and software-based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
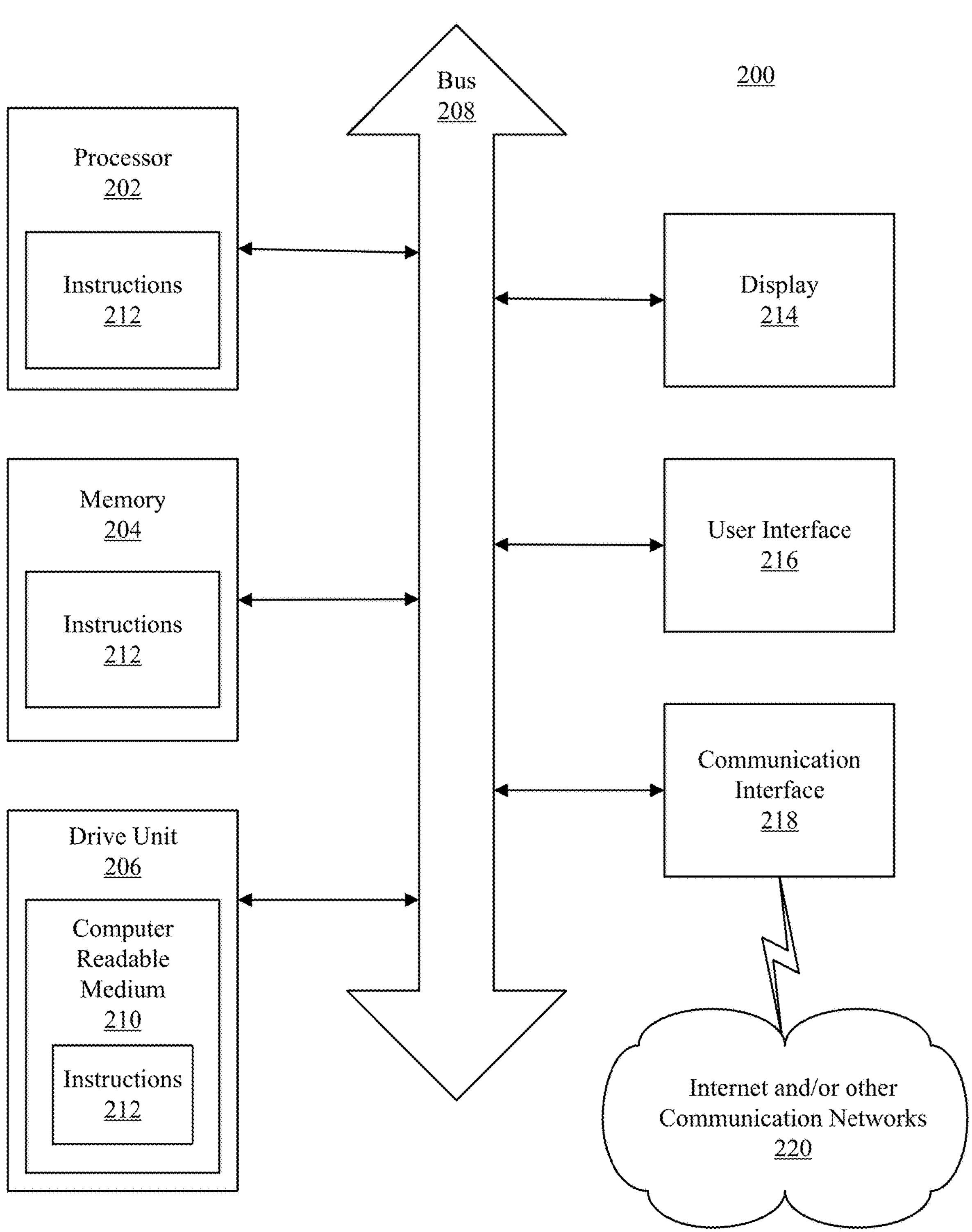
FIG. 2 depicts a general computer system, according to some embodiments.

The exchange computer system 100 may be implemented with one or more mainframe, server, desktop, or other computers, such as the example computer 200 described herein with respect to FIG. 2. A user database 102 may be provided which includes information identifying traders and other users of exchange computer system 100, such as account numbers or identifiers, usernames, and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, trade database 108 may store information identifying the time that a trade took place and the contract price.

An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users.

For example, the market data module 112 may prepare the market data feeds described herein.

A risk management module 114 may be included to compute and determine a user's risk utilization in relation to the user's defined risk thresholds. The risk management module 114 may also be configured to determine risk assessments or exposure levels in connection with positions held by a market participant. The risk management module 114 may be configured to administer, manage, or maintain one or more margining mechanisms implemented by the exchange computer system 100. Such administration, management or maintenance may include managing a number of database records reflective of margin accounts of the market participants. In some embodiments, the risk management module 114 implements one or more aspects of the disclosed embodiments, including, for instance, principal component analysis (PCA) based margining, in connection with interest rate swap (IRS) portfolios, as described herein.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the Market Segment Gateway ("MSG") that is the point of ingress/entry and/or egress/departure for all transactions, i.e., the network traffic/packets containing the data therefore), message type (e.g., new, modify, cancel), and the number of matches generated by a message. Order or message characteristics may also include market participant side (e.g., buyer or seller) or time in force (e.g., a good until end of day order that is good for the full trading day, a good until canceled ordered that rests on the order book until matched, or a fill or kill order that is canceled if not filled immediately, or a fill and kill order (FOK) that is filled to the maximum amount possible based on the state of the order book at the time the FOK order is processed, and any remaining or unfilled/unsatisfied quantity is not stored on the books or allowed to rest).

An order processing module 118 may be included to decompose delta-based, spread instrument, bulk, and other types of composite orders for processing by the order book module 110 and/or the match engine module 106. The order processing module 118 may also be used to implement one or more procedures related to clearing an order. The order may be communicated from the message management module 116 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module 118 may execute an associated action of placing the order into an order book for an electronic trading system managed by the order book module 110. In an embodiment, placing an order into an order book, i.e., storing data indicative thereof into the order book database/data structure and/or into an electronic trading system may be considered a primary action for an order. The order processing module 118 may be configured in various arrangements, and may be configured as part of the order book module 110, part of the message management module 116, or as an independent functioning module.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, a settlement module 120. The settlement module 120 (or settlement processor or other payment processor) may be included to provide one or more functions related to settling or otherwise administering transactions cleared by the exchange. The settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

In some embodiments, the settlement module 120 may be integrated to any desired extent with one or more of the other modules or processors of the exchange computer system 100. For example, the settlement module 120 and the risk management module 114 may be integrated to any desired extent. In some cases, one or more margining procedures or other aspects of the margining mechanism(s) may be implemented by the settlement module 120.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s). It should be appreciated that concurrent processing limits may be defined by or imposed separately or in combination on one or more of the trading system components.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade, clearing or other information therewith, such as by using messaging via the messaging module 116. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computers and other devices which are coupled with the LAN 160. Computers and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet based compute device, or other wireless device, may communicate with the LAN 160 and/or the Internet 162 via radio waves, such as via Wifi, Bluetooth and/or a cellular telephone based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 166 which may maintain a market by providing constant bid and offer prices for a derivative or security to the exchange computer system 100, such as via one of the exemplary computer devices depicted. The exchange computer system 100 may also exchange information with other match or trade engines, such as trade engine 170. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 154 may include computer-executable instructions for receiving market data from exchange computer system 100 and displaying that information to a user.

Numerous additional servers, computers, handheld devices, personal digital assistants, telephones, and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system or physical server 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed herein, such as a processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video, or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firmware, micro-code, and the like, operating alone or in combination. Likewise, processing strategies may include multiprocessing, multitasking, parallel processing, and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device/user interface 216 configured to allow a user to interact with any of the components of system 200. The input device 216 may be a number pad, a keyboard, or a cursor control device, such as a mouse, or a joystick, touch screen display, remote control, or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images, or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that causes a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include shared or proprietary distributed processing, e.g., a cloud/shared host-based implementation, component/object distributed processing, and parallel processing. Alternatively, virtual computer system processing, e.g., using proprietary and/or cloud/shared host-based implementations, can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks," and a hierarchy of reconfigurable interconnects that allow the blocks to be "wired together," somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end/hardware component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship with each other.

Resiliency Module/Tiered Resiliency Container Architecture

Figure 7A:
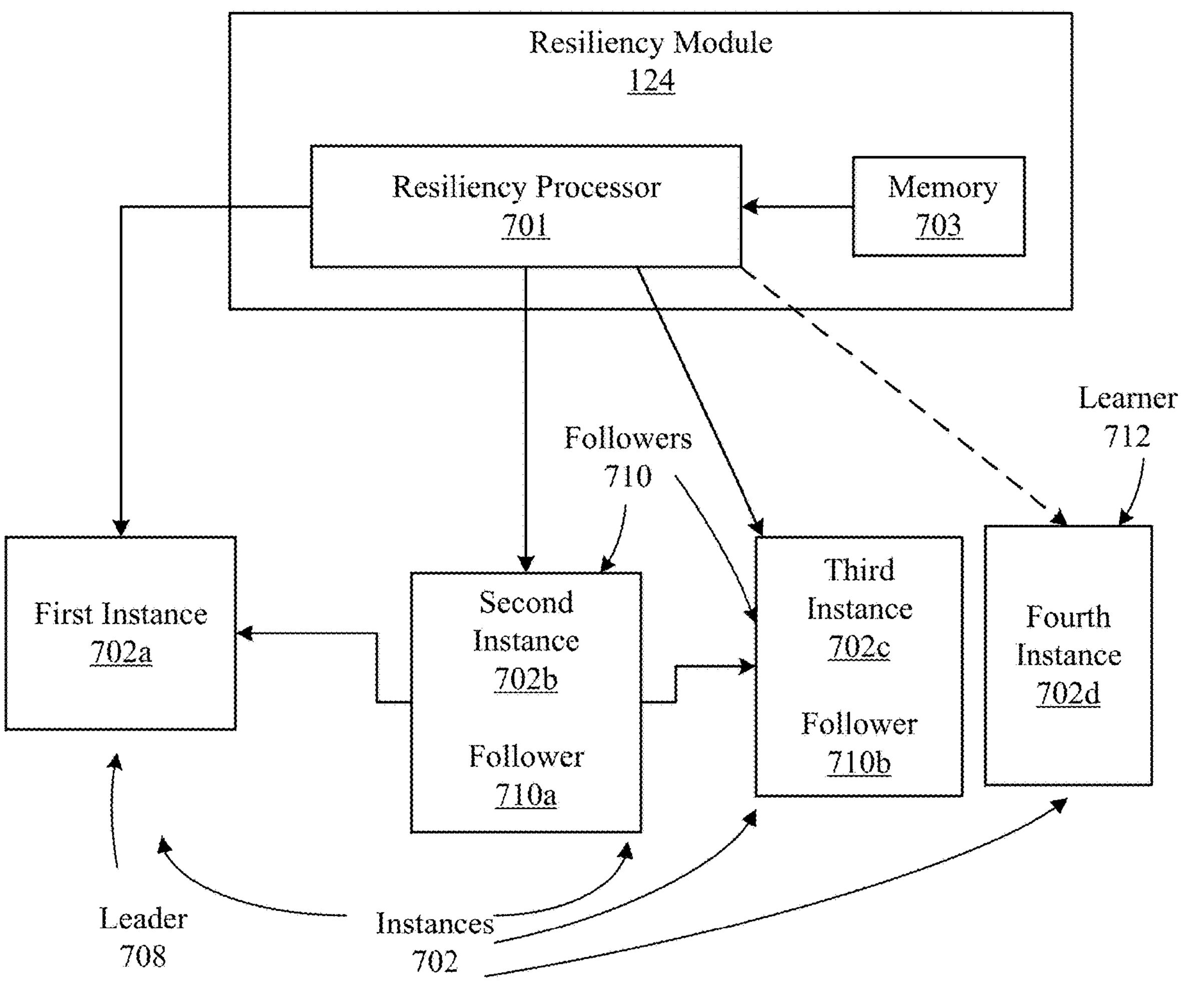
FIG. 7A depicts a block diagram of a system for providing resiliency according to some embodiments.

In some embodiments, a resiliency module 124 may be included to provide resiliency to the exchange computer system 100 as described herein. The resiliency module 124 may be implemented by one or more specifically configured resiliency processor(s) 701 as shown in FIG. 7A, such as the processor 202 shown in FIG. 2. The resiliency module 124 may be included to manage the deployment of containerized applications as described herein to, for example, instantiate, monitor, and manage at least three instances 702 of a containerized process which may include any of the above described modules/applications/components such as for example, the risk management module 114 or the settlement module 120. The resiliency module 124 may be disposed remotely from where the instances 702 are operating. For example, the resiliency module 124 may operate on a different computer and may be located in a different region/zone. The resiliency module 124 may be further included to determine that a failure of a leader 708 or follower instance 710 has occurred and based thereon, instantiate another instance 702 of the containerized process as a replacement. The resiliency module 124 may further instantiate a learner instance 712 to provide an upgrade to a new version of the transaction processing application. In particular, the resiliency module 124 may instantiate at least two more learner instances 712 of the containerized process in the data processing environment, each comprising the instance of the modified version of transaction processing application, migrate the leader instance 708 to a follower instance 710 comprising the original version of the transaction processing application, upgrade one of the learner instances 712 to a leader instance 708 and the other learner instances 712 to follower instances 710, and remove each of the follower instances 710 comprising the original version of the transaction processing application.

FIGS. 3-6A show logical diagrams 300, 400, 500, and 600A of different implementations of the disclosed resilient architecture. In particular, FIGS. 3-6A show different arrangements of instances of the containerized process and their logical interconnections.

Figure 3:
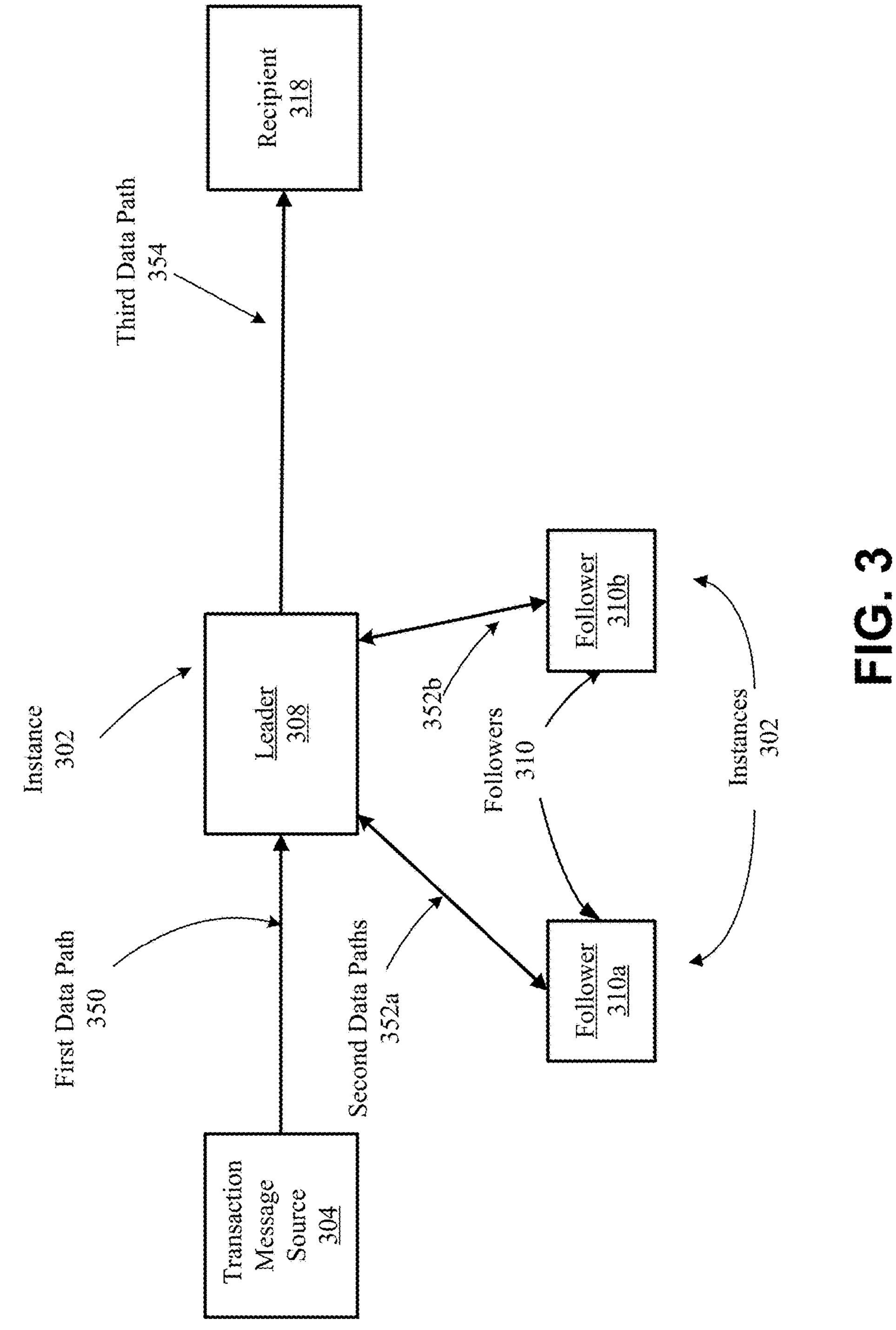
FIG. 3 depicts a logical diagram of an implementation of the disclosed resilient architecture according to some embodiments.

As shown in FIG. 3, at least three instances 302 have been instantiated. Each instance is configured to coordinate with the others to designate one of the instances as a leader instance/leader 308 and each remaining of the containerized processes as a follower instance/follower 310.

In particular, the at least three instances 302 may be instantiated as follower instances 310. As further explained below, each follower instance 310 may be configured to coordinate with the others to designate one of the follower instances as a leader instance 308.

The leader instance/leader 308 may be configured to receive, via an electronic communications network, e.g., via a first data path 350, from the transaction message source 304, one or more transaction messages to be processed thereby.

In one embodiment, the leader instance 308 is further configured to forward, via the electronic communications network, e.g., via one or more logical and/or physical second data paths 352*a* and 352*b*, prior to processing the received one or more transaction messages, a copy of the one or more transaction messages to each of follower instances/followers 310, e.g., follower instances 310*a* and 310*b*. The one or more transaction messages may include input streams, incoming transaction request messages, instructions, operations, tasks, transactions, and the like from one or more transaction message sources 304 such as one or more client computers, timing control devices, instruction generators, and the like. The leader instance 308 is configured to await an acknowledgment message from a majority thereof indicative of the follower instance 310 having at least acknowledged that the one or more transaction messages will be processed by the leader instance 308. The leader instance 308 is further configured to process the one or more transaction messages only upon receipt of the acknowledgment messages from a majority of the follower instances 310*a* and 310*b*.

In one embodiment, the leader instance 308 is further configured to generate result messages indicative of the processing of the one or more transaction messages and transmit the result messages to a recipient 318, via the communications network, e.g., via a third data path 354. In some embodiments, only the leader instance 308 is configured to transmit the result messages to the recipient 318. The recipient 318 may include a database in which a processing result is to be stored, a message recipient such as a recipient of a market data message, and the like.

In some embodiments, the communication of the acknowledgment message from each follower instance 310*a* and 310*b* to the leader instance 308 takes an amount of time dependent on a logical and/or physical distance between that follower instance 310 and the leader instance 308, e.g., the logical and/or physical distance via the one or more second data paths 352*a* and 352*b*. The leader instance 308 is configured to process the one or more transaction messages until the last acknowledgment message is received from the majority of the follower instances 310*a* and 310*b*.

Figure 4:
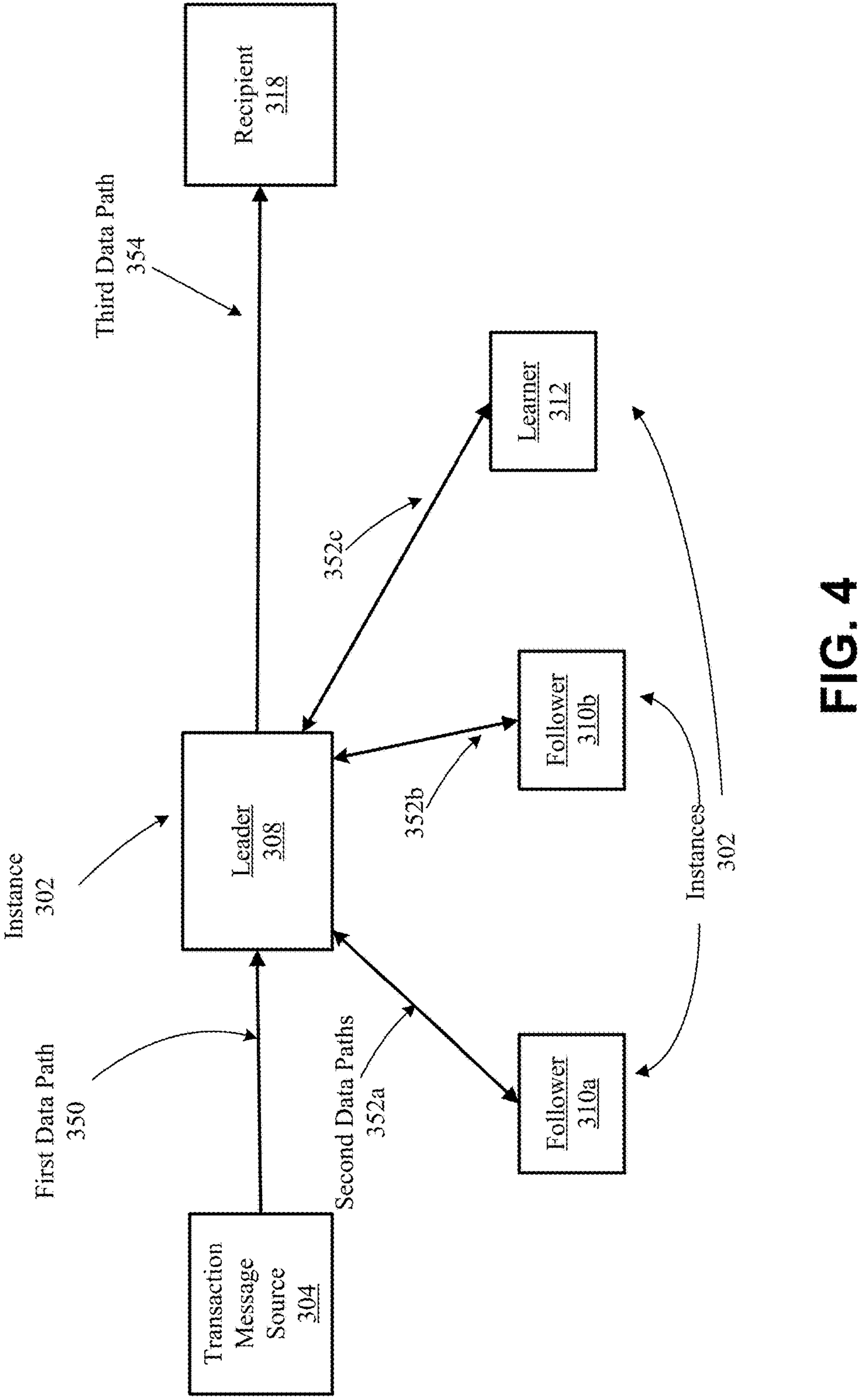
FIG. 4 depicts a logical diagram of an implementation of the disclosed resilient architecture according to some embodiments.

Referring to FIG. 4, in some embodiments, at least one learner instance 312*a* of the containerized process may be instantiated in the data processing environment. The learner instance 312*a* may comprise an instance of another transaction processing application configured to execute transactions received thereby. The leader instance 308 may be further configured to forward, prior to processing the received one or more transaction messages, via a communications network, e.g. via one or more second data paths 352*a*, 352*b*, and 352*c*, a copy of the one or more transaction messages to each of the at least one learner instance 312.

In some embodiments, as shown in FIGS. 5 and 6, some of the instances 302 may be instantiated in different zones and/or different geographic regions to achieve regional and/or multi-regional resiliency based on predetermined resiliency and performance goals. In particular, instantiating instances 302 in disparate geographic regions may minimize the likelihood of a same failure or maintenance event compromising the availability of the instances 302.

In some embodiments, two or more of the at least three instances 302 may be instantiated in different computing zones of a geographic region. A region may refer to a specific geographical location where resources may be hosted. A region may have one or more zones. For example, as shown in FIG. 5, the leader instance 308 may be instantiated in Zone A, e.g., “us-west1-a”, the follower instance 310*a* may be instantiated in Zone B, e.g., “us-west1-b”, and the follower instance 310*b* may be instantiated in Zone C, e.g., “us-west1-c”, of geographic region A. In other words, the leader instance 308, and the follower instances 310*a* and 310*b* may be instantiated in geographical region A, e.g., “us-west 1”.

Further, two or more of the at least three instances 302 may be instantiated in different geographic regions. For example, as shown in FIGS. 5 and 6, the leader instance 308 and the follower instances 310*a* and 310*b* may be instantiated in different zones within Region A: Region A-Zone A, Region A-Zone B, and Region A-Zone C respectively. Further, follower instances 310*c* and 310*d* may be instantiated in geographical region B in different zones within Region B: Region B—Zone A and Region B—Zone B respectively.

Figure 6A:
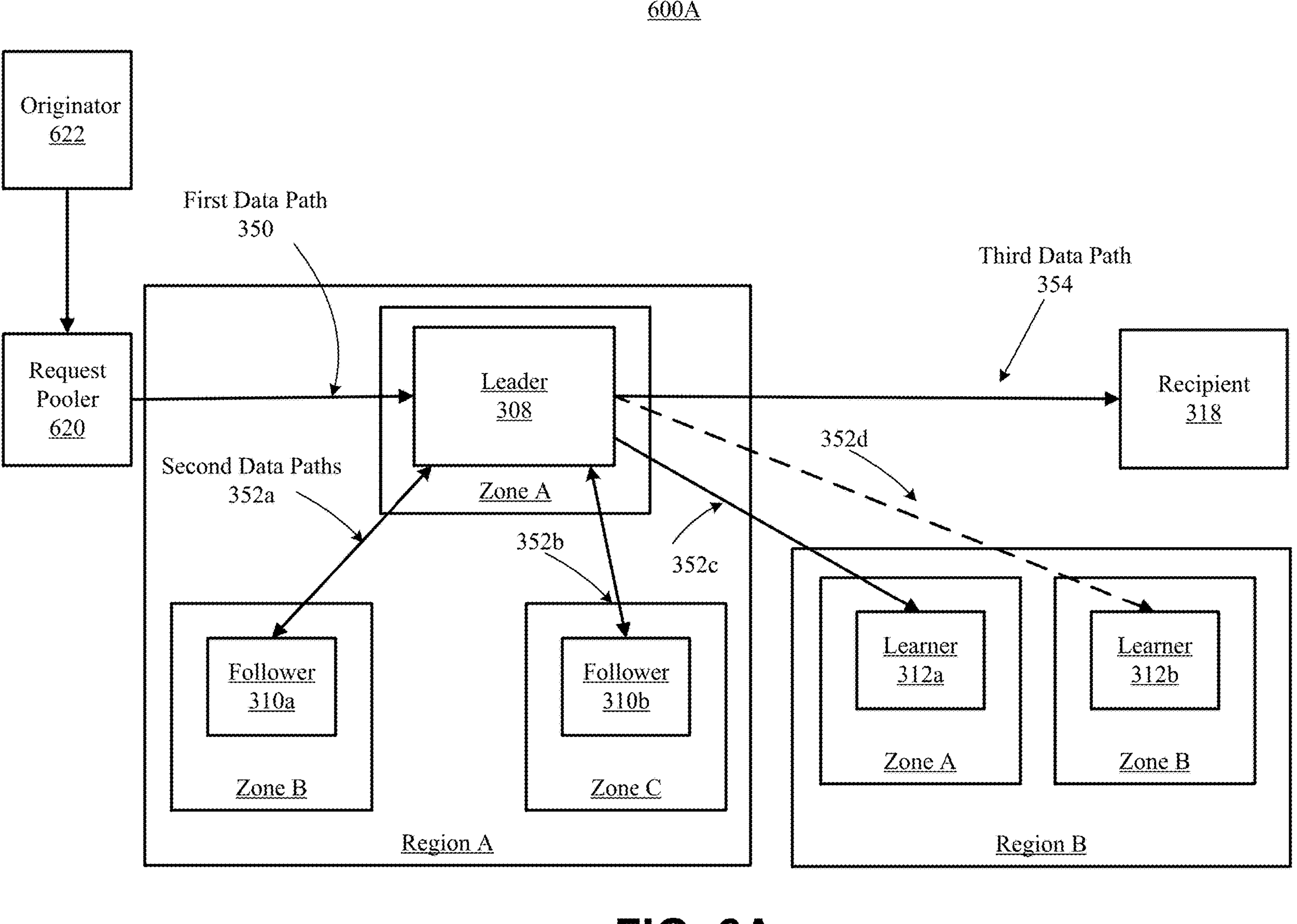
FIG. 6A depicts a logical diagram of an implementation of the disclosed resilient architecture according to some embodiments.

In some embodiments, as shown in FIGS. 5 and 6A, the leader instance 308 and the follower instances 310*a* and 310*b* may be instantiated in different zones within Region A: Region A-Zone A, Region A-Zone B, and Region A-Zone C respectively. Further, learner instances 312*a* and 312*b* may be instantiated in geographical region B in different zones within Region B: Region B—Zone A and Region B—Zone B respectively.

In some embodiments, as shown in FIG. 6A, the one or more transaction message sources 304 may comprise a request pooler 620 disposed between one or more originators 622 of the transaction messages and the leader instance 308. In particular, the request pooler 620 may be implemented by a specifically configured request pooler processor (not shown) such as the processor 202 shown in FIG. 2. The request pooler 620 may be configured to receive transaction messages from the one or more originators 622 and may be configured for adaptive pooling, i.e., to batch the one or more transaction messages. In one embodiment, the request pooler 620 may batch the one or more transaction messages based on a prespecified RPO. In particular, the request pooler 620 is configured to batch, i.e., to store the received transaction messages in a buffer until an occurrence of an event, e.g., time expiration, threshold number of messages received, and the like. Upon the occurrence of the event, the request pooler 620 is configured to forward all of the stored received transaction messages to the leader instance 308 in a single communication, e.g., in a single publishing event. The leader instance 308 may forward, prior to processing the received one or more transaction messages, via a communications network, e.g. via one or more second data paths

352*a*, 352*b*, 352*c*, and 352*d*, a copy of the one or more transaction messages to each of the at least one learner instances 312*a* and 312*b*.

Every time a transaction message is transmitted to the leader instance 308, there is overhead, i.e., "publishing time" to transmit it. By batching messages together into single communications, the "publishing time" or messaging overhead is reduced.

In one implementation, in a three zone configuration having about 1 ms wire time for an acknowledgement message to be transmitted between instances, only 1k transaction messages/second throughput is achieved if the one or more transaction messages are transmitted at wire speed. In contrast, by batching the one or more transaction messages, the adaptive request pooler 620 may achieve handling 20k transaction messages/second. Similarly, it takes about 20 ms for transactions to be transmitted cross-region which would restrict the throughput to 50 transaction messages/sec for multi-region consensus. However, the request pooler 620 is able to achieve 3.5k transaction messages/sec with adaptive pooling.

Figure 6B:
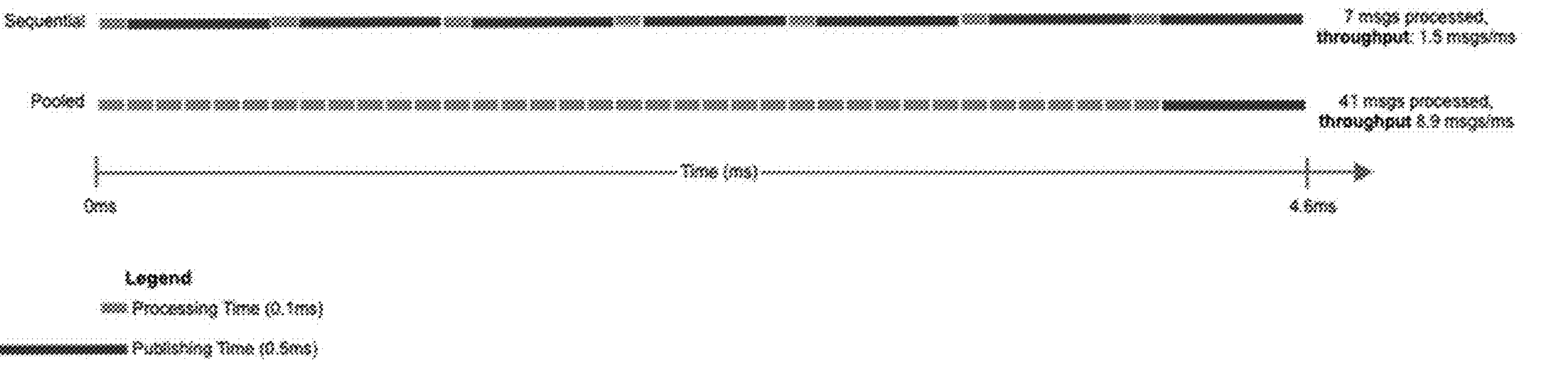
FIG. 6B depicts a graph of two systems using a sequential processor versus request pooler processor according to some embodiments.

FIG. 6B depicts a graph 600B of two systems comparing a sequential processor versus a request pooler processor according to some embodiments. As can be seen, in one implementation, the use of the request pooler 620 improves the throughput of the one or more transaction messages from 1.5 transaction messages/ms when the request pooler 620 is used to 8.9 transaction messages/ms when the request pooler 620 is not used.

In one embodiment, the request pooler 620 may sequence the received transaction messages so that new follower instances 310 may be able to synchronize with an existing follower instance 310.

FIG. 7A depicts a more detailed block diagram of the resiliency module 124 of FIG. 1 illustrating a computer system 700A to provide redundancy to a transaction processing application according to some embodiments. In particular, the computer system 700A provides a tiered resiliency container architecture as described herein for any of the one or more functions, modules, any one or more subsets of the functions/modules or all of the functions/modules shown in FIG. 1 described in more detail above. The choice of which functions/modules or subsets thereof are implemented according to the disclosed embodiments is implementation dependent.

The computer system 700A includes a resiliency module 124 including a resiliency processor 701, such as a specifically configured processor 202 as shown in FIG. 2 and a non-transitory memory 703, such as a non-transitory memory 204 as shown in FIG. 2 coupled therewith. The non-transitory memory 703 comprises computer executable instructions that, when executed by the resiliency processor 701, cause the resiliency processor 701 to initially instantiate at least three instances 702, e.g., a first instance 702*a*, a second instance 702*b*, and a third instance 702*c*, of a containerized process in a data processing environment, each comprising an instance of the transaction processing application configured to execute transactions received thereby. Each instance 702 of the containerized process is configured to coordinate with others of the containerized processes to designate one of the instances of the containerized process as a leader instance 708 and each remaining of the containerized processes as a follower instance, e.g., follower instances 710*a* and 710*b*.

In some embodiments, as further described below, e.g., upon determination of a failure in one or more instances 702, to achieve different levels of resiliency and performance, and the like, the resiliency processor 701 may be further configured to instantiate replacement follower instances 710. In some embodiments, the replacement follower instances 710 may be a function of a containerization software further described below with respect to FIG. 7C.

In some embodiments, the computer executable instructions may be further executable by the resiliency processor 701 to cause the resiliency processor 701 to instantiate at least one learner instance 712 of the containerized process in the data processing environment. The learner instance 712 may comprise an instance of another transaction processing application 713 configured to execute transactions received thereby.

Figure 7B:
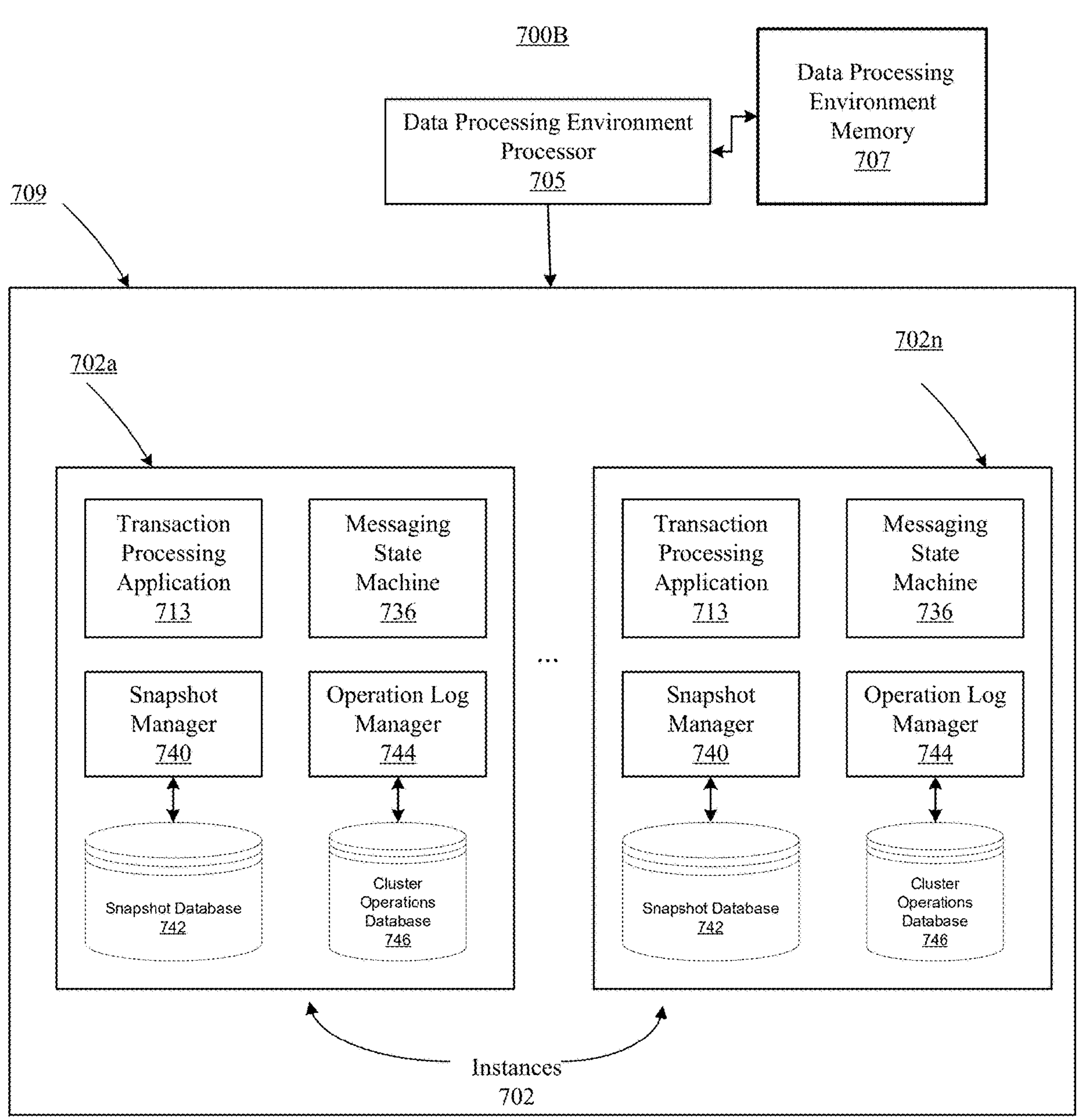
FIG. 7B depicts a block diagram of each instance of a containerized process in a data processing environment according to some embodiments.

Referring now to FIG. 7B, an illustrative embodiment of multiple instances 702*a-n* of a containerized process deployed in a data processing environment 709 in a computer system 700B. In particular, the instance 702*a* may be instantiated, monitored, and managed by the resiliency processor 701. Further, the instance 702*a* may be hosted by the data processing environment 709 which may be implemented by one or more data processing environment processor(s) 705, such as a specially configured processor 202 as shown in FIG. 2 and one or more data processing environment memory(ies) 707 such as a non-transitory 204 as shown in FIG. 2 coupled therewith. In some embodiments, the resiliency processor 701 may instantiate and manage at least three instances 702*a*-702*n* hosted by the data processing environment 709. In some embodiments, the data processing environment 709 may comprise different host computers in different zones or regions.

In some embodiments, each instance 702 may include an instance of a transaction processing application 713 configured to execute transactions received thereby. In some embodiments, as further described below with regards to FIG. 7C, each instance 702 may further include a messaging state machine 736, a snapshot manager 740 coupled with a snapshot database 742, and an operation log manager 744 coupled with a cluster operations database 746.

Figure 7C:
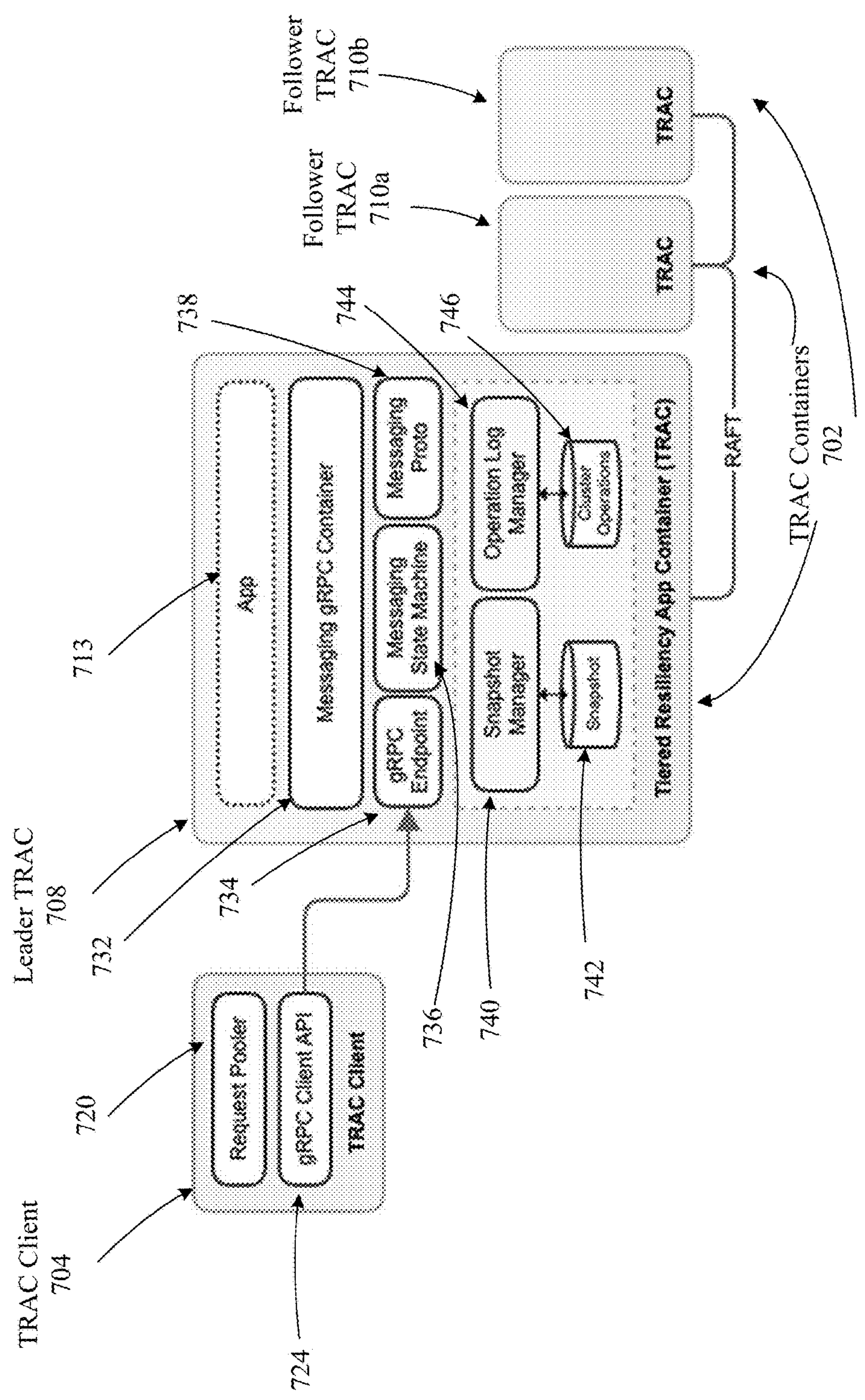
FIG. 7C depicts a detailed block diagram of each instance of the containerized process shown in FIG. 7B according to some embodiments.

FIG. 7C shows a more detailed implementation of each instance 702 shown in FIG. 7B. In one embodiment, as shown in FIG. 7C, further described below, each instance 702 may be implemented as a TRAC instance 702 by the resiliency processor 701. The resiliency processor 701 may be disposed remotely from where the TRAC instances/TRACs 702 are operating.

FIG. 7C illustrates a tiered resilience application container (TRAC) system/architecture 700C according to some embodiments. The TRAC system/architecture 700C may include one or more identical TRAC containers/instances 702 that implement the at least three or more instances of a containerized process, each comprising an instance of a transaction processing application 713. As described above, each TRAC instance 702 of the containerized process may be configured to coordinate with others of the containerized processes to designate one of the TRACs 702 as the leader TRAC 708 and each remaining of the TRACs 702 as a follower TRAC 710*a* and 710*b*. The leader TRAC 708 may receive, via an electronic communications network 220 from a TRAC Client 704, one or more transaction messages to be processed thereby. The transaction processing application/App 713 may be configured to execute transactions received thereby.

The system/architecture in which one or more identical TRAC instances 702 may be deployed may include a hardware layer which implements an operating system. As shown in FIG. 7B, the hardware layer may include storage, e.g., one or more data processing environment memory 707 such as the non-transitory memory 204 as shown in FIG. 2, network devices, computing systems, host machines, physical hardware servers, and other hardware such as one or more specifically configured data processing environment processors 705 such as the processor 202 as shown in FIG. 2. The operating system may or may not host one or more virtual servers. The operating system or each hosted virtual server may be running an operating system that includes a container management component or layer to manage any containers which are deployed on the virtual server of that physical hardware server. The resiliency processor 701 may be configured to cause the container management component to deploy/instantiate one or more of the TRAC's 702.

Regarding the operating system, in some embodiments, Linux may be used as the operating system for containerization with on-premises computers. In cloud computing, cloud services such as Google Kubernetes Engine (GKE) may be used to run containerized applications.

In some embodiments, instantiation of each instance 702 of the containerized process may comprise containerization of the transaction processing application 713. Containerization may include bundling the instance of the transaction processing application 713 with the application code and the other files e.g., library dependencies and related configuration files that contain the necessary information to run the containerized transaction processing application 713. In particular, the containerized transaction processing application/service 713 including its dependencies and related configuration files may be hidden/abstracted from the operating system and the underlying infrastructure. The containerized transaction processing application 713 may be read-only and cannot be altered by the host computer.

A benefit of the TRAC approach is providing handling of intermittent failure using the same architecture for any tier of resilience. The TRAC architecture provides a consensus cluster and protocol that ensures that a consensus threshold, e.g., a majority (50%+1), of the TRACs 702 are synchronized before proceeding with the next transaction.

Snapshot and log management may be provided for the consensus protocol to operate. In particular, as further explained below, in some implementations, each TRAC 702 may include a snapshot manager 740 coupled with a snapshot database 742, and an operation log manager 744 coupled with a cluster operations database 746.

In some implementations, e.g., for transaction processing applications 713 that include a messaging application, the TRAC 702 may further include the messaging state machine 736. The messaging state machine 736 may be configured to manage the state of the message sequences and to keep track of the state of the TRAC 702 based on which transactions have been processed by the transaction processing application. In particular, the snapshot manager may write the aggregated state of the leader and a sequence number to the snapshot database 742.

As further explained below, follower instances 710 may keep track of the last message processed by the leader instance 708, i.e., its state. Therefore, when a follower instance 710 acknowledges receipt of a transaction message back to the leader instance 708, the follower instance 710 may update its messaging state machine 736 to reflect which message was the last message processed by the leader instance 708.

In some embodiments, the snapshot database 742 and the cluster operations database 746 may include in-memory databases, i.e., virtual disks or data stores created inside the TRAC 702.

The snapshot manager 740 may be configured to store, in the snapshot database 742, a periodic snapshot, i.e., an aggregation, of the state of the transaction processing application 713 of the leader instance 708. Thus, other instances 702, e.g., the follower instances 710 in the consensus cluster, may be able to bootstrap quickly and retrieve the state of the transaction processing application 713. The snapshot may be sequenced by the communication protocol. The snapshot database 742 may be used only when a new follower instance 710 is bootstrapped and requests the snapshot from the leader instance 708 to catch up/synchronize with the other follower instances 710. In some embodiments, the snapshot database 742 may store other information produced by the transaction processing application 713 when it processes transaction messages.

In some embodiments, if the leader instance 708 fails, one of the follower instances 710 may be instantiated as a new leader instance 708 and its transaction processing application 713 may start to produce outputs. Thus, the new leader instance 708 needs the information to determine where the failed leader instance left off, as well as any other data the new leader instance 708 needs to know, in order to start operating as the new the leader instance 708. The necessary data that the new leader instance 708 needs to know in order to start operating may vary based on the complexity of the transaction processing application 713.

The operation log manager 744 may be configured to store a log of the transaction operations and the data together in the cluster operations database 746. In particular, the operation log manager 744 may write every transaction message received (operation and data) to a file or to the cluster operations database 746. Therefore, the transaction operations may be replayed at any given time to be used, for any purpose in the future, e.g., during recovery after a failure. Specifically, if a new instance 702 is instantiated in the consensus cluster, the newly instantiated instance 702 may request the sequenced snapshot, i.e., the periodic aggregation of the state of the application, and a log of the transaction operations and data from the leader instance 708. The newly instantiated instance 702 may receive the sequenced snapshot and the log of the transaction operations and data from the leader instance 708. The newly instantiated instance 702 may use the log of the transaction operations to apply any missing transaction operations to be synchronized with the rest of the instances 702 of the consensus cluster.

In some embodiments, the resiliency processor 701 may determine that a failure of a follower instance **710*b* has occurred and based thereon, the resiliency processor 701 may instantiate another follower instance 710*c*** of the containerized process as a replacement.

In some embodiments, the other follower instance **710*c*, upon instantiation, may communicate with the leader instance 708 to determine if any transaction messages require sending an acknowledgment to the leader instance 708**.

After the other follower instance **710*c* is instantiated, the follower instance 710*c* may start up and request the leader instance 708 for a snapshot and a message sequence to bring the follower instance 710*c* up to the current state of the consensus cluster. The leader instance 708 may transmit/send the snapshot, which is up to a certain sequence number, e.g., 10. The leader instance 708 may also send any transaction data from the cluster operations database 746 that is not in the snapshot up to the current transaction number, e.g., to get the new follower 710*c* to the current state. Therefore, a snapshot of the transaction message for sequence 10 and two transaction messages for sequences 11 and 12 may be retrieved respectively from the snapshot database 742 and the cluster operations database 746 by the follower instance 710. For those two transaction messages, the new follower instance 710***c* may respond as if the follower instance 710*c* was processing a routine transaction flow. If the leader instance 708 was blocked on an acknowledgement message for transaction message 12 due to follower instances 710, e.g., 710*b*, failures beyond the consensus threshold, this new instantiated follower instance 710 may service that need by acknowledging transaction message 12. The leader instance 708 may then proceed to process transaction message 12 only upon achieving the consensus threshold and transmit a copy of a next transaction message 13 to the follower instances 710.

In some implementations, the communication between the TRAC instances 702 may be implemented via the electronic communications network 220 using RPC. In some implementations, gRPC may be the communication layer between the TRAC instances 702 to support a microservices model.

In some implementations, the communication between the TRAC Client 704 and the Leader TRAC 708 may be performed via the electronic communications network 220 using an RPC client API, e.g., a gRPC client API 724. In one implementation, each TRAC 702 may further include a messaging gRPC container 732 and a gRPC endpoint 734. In some implementations, e.g., for transaction processing applications that include a messaging application, a messaging protobuf data format 738 may be included. The messaging gRPC container 732 may be generalized for messaging applications to directly port on to. The messaging protobuf data format 738 may be used for messaging communication and may enable standardization of message structure and API via Objects, e.g., java serialized objects.

Since synchronization affects the throughput, i.e., the amount of data transmitted through the electronic communications network 220, e.g., for multi-region deployment, a request pooler 720 may be used to adaptively improve the throughput when utilizing multiple regions. In some implementations, the request pooler 720 on the client end achieves high gRPC rates. Pooling at the client results in pooling on the TRAC cluster as well thus improving intra-cluster performance. In some embodiments, the request pooler 720 may provide controlled pooling based on a predefined RPO.

In one implementation, the TRAC leader 708 may communicate to the TRAC followers 710*a* and 710*b* via Reliable, Replicated, Redundant, and Fault-Tolerant (RAFT) communication protocol. RAFT may offer a generic way to distribute the state of the messaging state machine 736 across a cluster of TRACs 702, ensuring that each TRAC 702 in the cluster agrees upon the same series of state transitions. RAFT may have a number of open-source reference implementations, with full-specification implementations in Go, C++, Java, and Scala.

It should be appreciated that the types of communications, messaging, remote procedure calls, and data formats is implementation dependent and may vary and that not all of the depicted means/media of communication may be used and that other means/media of communications, now available or later developed may be used.

Figure 8:
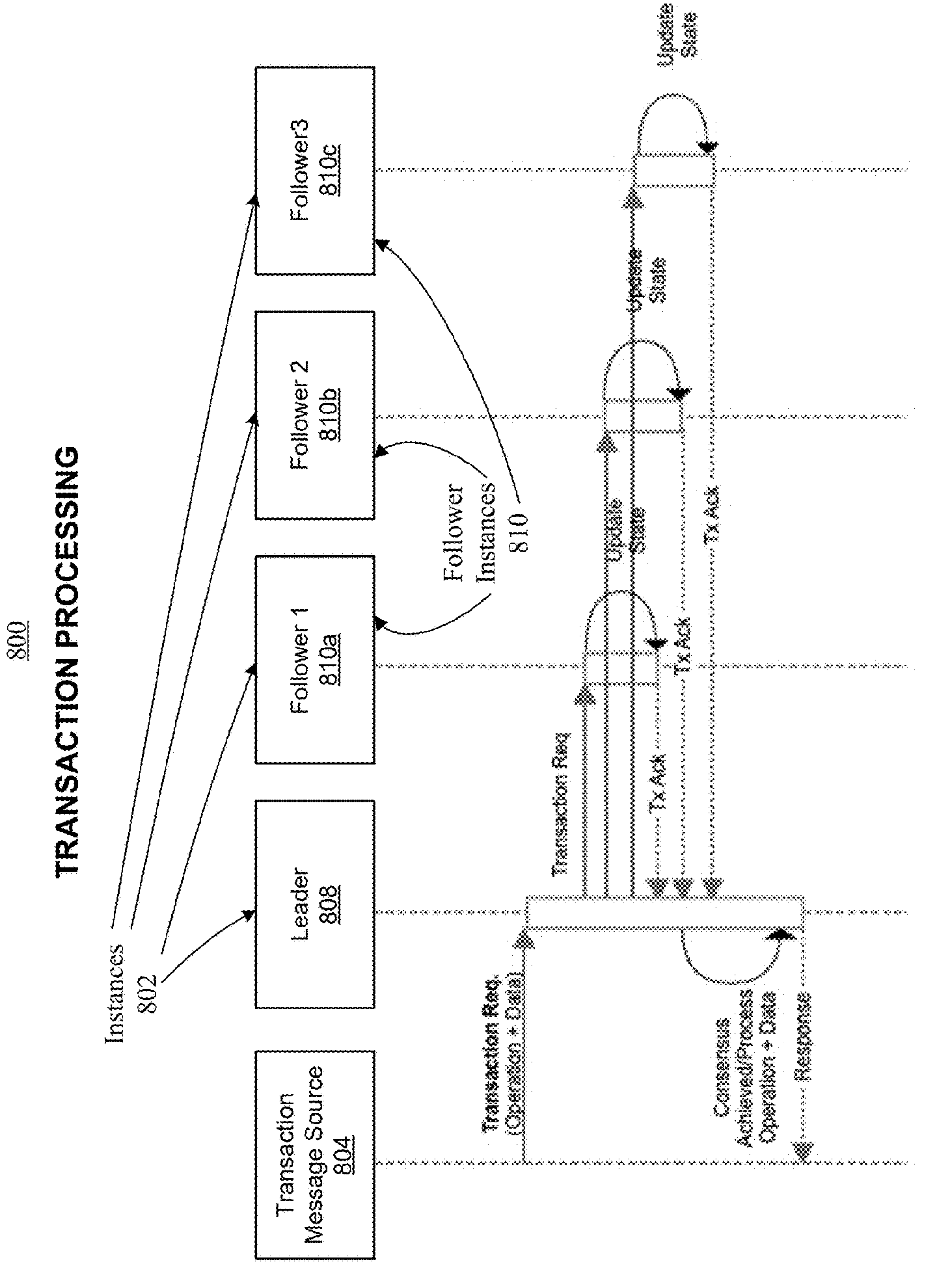
FIG. 8 depicts a sequence diagram of a transaction processing sequence of an application container system according to some embodiments.

FIG. 8 depicts a sequence diagram 800 of a transaction processing sequence of an application container system including instances 802 according to some embodiments.

As shown in FIG. 8, each instance 802 may include an instance of the transaction processing application configured to execute transactions received thereby. Each instance 802 of the containerized process may coordinate with others of the containerized processes to designate one of the instances of the containerized process as a leader instance/leader 808 and each remaining instance of the containerized processes as a follower instance/follower 810 including a follower 1 instance 810*a*, a follower 2 instance 810*b*, and a follower 3 instance 810*c*. The leader instance 808 may receive, via an electronic communications network from one or more transaction message sources 804, one or more transaction messages, e.g., transaction request messages including operation and data, to be processed thereby. The leader instance 808 may forward, via the electronic communications network, prior to processing the received one or more transaction messages, a copy of the one or more transaction messages to each of the follower instances 810. Once received, based on the transaction processing application, e.g., whether the transaction processing application is a stateful application or not, each of the follower instances 810*a*, 810*b*, and 810*c* may perform one or more of processing, storing, or discarding the transaction message. In some embodiments, each follower instance 810 may process the transaction message and update its respective state similar to the leader instance 808. However, each follower instance 810 may not send a result message to a recipient.

The leader instance 808 awaits an acknowledgment message (TX ACK) from a majority thereof indicative each of the follower instances 810*a*, 810*b*, and 810*c* having at least acknowledged that the one or more transaction messages will be processed by the leader instance 808.

In some embodiments, each follower instance 810*a*, 810*b*, and 810*c* may update their respective status to be synchronized with the leader instance 808.

The leader instance 808 may only process the one or more transaction messages only upon receipt of the acknowledgment messages from a majority of the follower instances 810. In other words, once a consensus has been achieved by the majority of the follower instances 810*a*, 810*b*, and 810*c*, the leader instance 808 may process the operations and data included in the one or more transaction messages.

Figure 9:
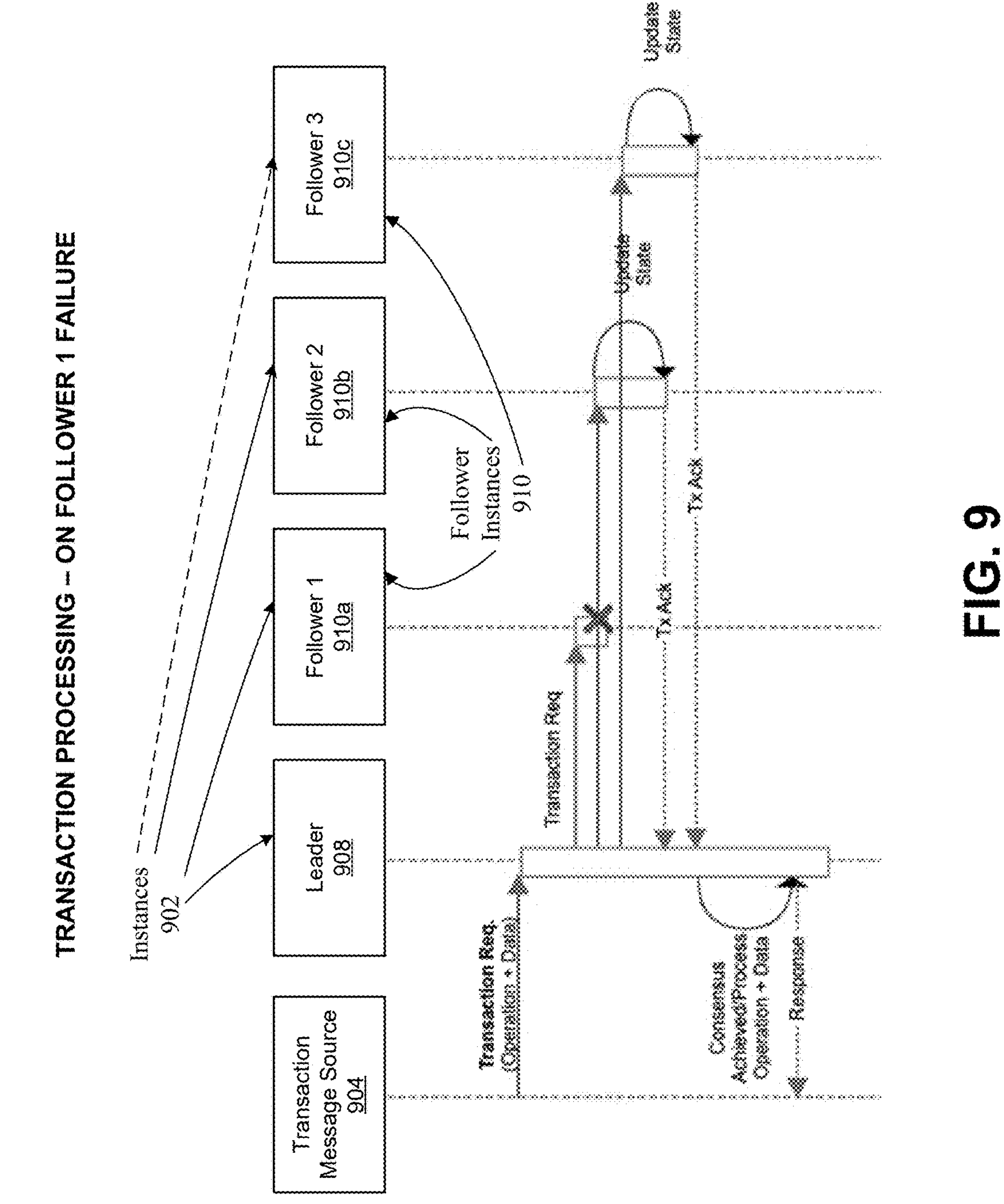
FIG. 9 depicts a sequence diagram of a failover sequence of a follower instance node in an application container system according to some embodiments.

FIG. 9 depicts a sequence diagram 900 of a failover sequence for a failure of a follower 1 instance 910*a* of an application container system including instances 902 according to some embodiments. The instances 902 may include a leader instance 908 and follower 1, 2 instances 910*a*, and 910*b*.

In one embodiment, the resiliency processor may be further configured to determine that a failure of a follower instance 910 has occurred and based thereon, instantiate another follower instance of the containerized process as a replacement. In particular, as shown in FIG. 9, the resiliency processor may determine that a failure of the follower 1 instance 910*a* has occurred and based thereon, instantiates a follower 3 instance 910*c*.

In one embodiment, the other follower instance, e.g., the follower instance 910*c*, upon instantiation, may be configured to communicate with the leader instance 908 to determine if any transaction messages require sending an acknowledgment to the leader instance 908. In particular, in some embodiments, as described above with regards to FIG. 7C, the newly instantiated follower instance 910*c* may request a snapshot and a log of transactions to determine if any transaction messages require sending an acknowledgement message.

In one embodiment, when the failure of the follower instance 910*a* prevents the leader instance 908 from receiving an acknowledgment message from a majority of the follower instances 910, the leader instance 908 may be further configured to wait for receipt of an acknowledgment message from the other follower instance 910*c* once instantiated.

Figure 10:
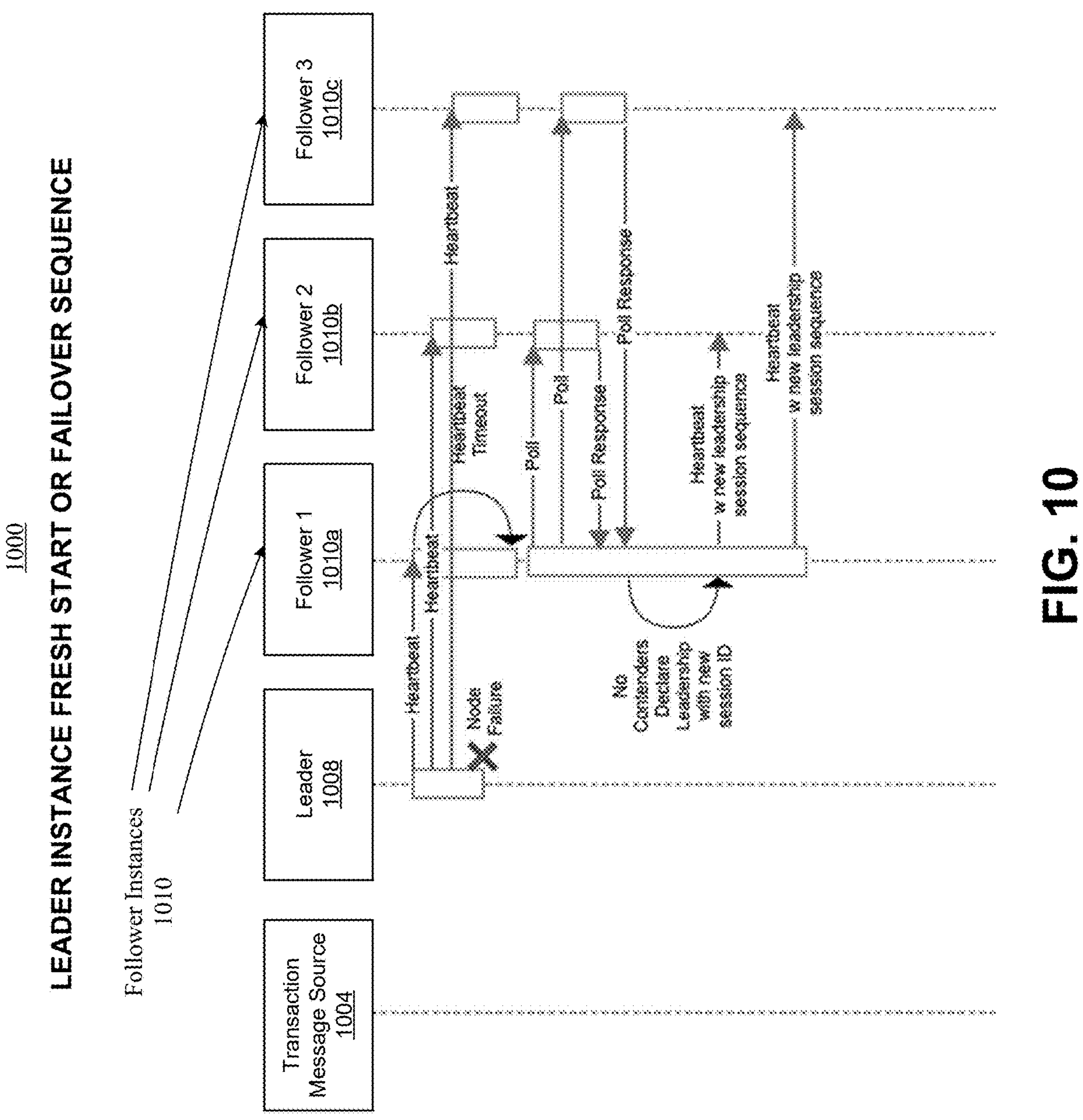
FIG. 10 depicts a sequence diagram of a fresh start or a failover sequence of a leader instance node in an application container system according to some embodiments.

FIG. 10 depicts a sequence diagram 1000 of a sequence for a fresh start or a fail-over sequence of a leader instance 1008 in a system for providing redundancy to a transaction processing application according to some embodiments.

In one embodiment, a plurality of instances may instantiated. Each instance may start either as a follower instance 1010 or as a learner instance (not shown).

In one embodiment, each instance may know that is part of the cluster and may be aware of the other plurality of instances that are part of the cluster. In particular, each instance may have access to a static configuration file that may indicate the instances that are members of the cluster.

Each of the follower instances 1010*a*, 1010*b*, and 1010*c* may be configured to, upon a fresh start, determine which of the follower instances 1010*a*, 1010*b*, and 1010*c* should be designated as the leader instance 1008. In one embodiment, the first of the follower instances, e.g., follower instance 1010*a*, may determine that it should be designated as the leader instance 1008 upon a fresh start and may initiate an arbitration, i.e., a poll, among the follower instances 1010*a*, 1010*b*, and 1010*c* to establish which of the follower instances 1010*a* should be designated as the leader instance 1008. In other words, the follower instance 1010*a* may be the first instance vying to be the leader instance 1008.

In one embodiment, each of the follower instances 1010*a*, 1010*b*, and 1010*c* are configured to, upon failure of the leader instance 1008, determine which of the follower instances 1010*a*, 1010*b*, and 1010*c* to replace the failed leader instance. In one embodiment the first of the follower instances, e.g., follower instance 1010*a*, that determines that the leader instance 1008 has failed, may initiate an arbitration, i.e., a poll, among the follower instances 1010*a*, 1010*b*, and 1010*c* to establish the first of the follower instances 1010*a* as the leader instance 1008. In other words, the follower instance 1010, e.g., 1010*a*, that first learns of the prior leader instance's failure may be vying to be the leader instance 1008.

In some embodiments, each of the follower instances 1010*a*, 1010*b*, and 1010*c* may be operative to receive heartbeat messages including a leadership session sequence, e.g., leadership session sequence=1, from the leader instance 1008. Heartbeat messages may be administrative messages used to ensure that a communication between the leader instance 1008 and the follower instances 1010 is functioning properly. In order to maintain communications or otherwise maintain the ability to transmit a copy of the transaction messages received from the transaction message source 1004, the leader instance 1008 may be required to send periodic heartbeat messages to each of the follower instances 1010, such as every 60 seconds, even when sending the copy of the transaction message or only when the source has not sent another copy of a transaction message for a defined period of time. A failure to receive the periodic heartbeat message by each of the follower instances 1010 may be indicative of a failure of the leader instance 1008. In other words, if a follower instance 1010 does not receive the heartbeat message from the leader instance 1008 by a heartbeat timeout, e.g., 60 seconds, the follower instance 1010 may determine that the leader instance 1008 is not operational due to a fresh start or to an occurrence of a failure of the leader instance 1008.

If a failure of the leader instance 1008 has occurred, the transaction messaging source 1004 may start getting timed out due to the lack of response from the leader instance 1008. Further, the follower instances 1010 may be in different states and may not be synchronized.

To avoid any contention, during a fresh start or a upon determining a failure of the leader instance 1008, the follower instance 1010*a* may notify, e.g., polls via a leadership polling message, each of the other follower instances 1010*b* and 1010*c* that it is trying to become the new leader instance and may await a confirmation therefrom.

In some embodiments, if two follower instances, e.g., 1010*a* and 1010*b*, think that they are the first to detect the leader instance failure or if they think that they should be the leader instance upon a fresh start, both follower instances 1010*a* and 1010*b* may begin the process of trying to become the leader instance. In particular, a leadership polling message may be sent by any follower instances 1010*a* and 1010*b* vying to be a new leader instance. The leadership poll message may include a new leadership session sequence and a polling timestamp generated by each vying follower instance 1010*a* and 1010*b*, e.g., for the follower instance 1010*a*, the leadership session sequence=2 and the timestamp=T1, for the follower instance 1010*b*, the leadership session sequence=3 and the timestamp=T2. The leadership poll message for each of the follower instances 1010*a* and 1010*b* may further include a flag indicating that the respective follower instance wants to become a new leader. The vying receiver instance(s) 1010*b* may back off and accept the polling message if the leadership session sequence or polling timestamp of their leadership polling message to request to become a leader instance occurs after the leadership sequence session or polling timestamp of the other follower instance 1010*a*. Other follower instance(s) 1010*c* that are not contending to become a leader may accept the follower instance 1010*a* as the new leader instance 1008. If a consensus number/majority of follower instances 1010 (50%+1) reply and acknowledge the polling message positively, then the follower instance 1010*a* may presume leadership, send a new heartbeat message with a new leadership session sequence, and start receiving the transaction messages from the TRAC Client 704. A negative response to a leadership poll may happen if another follower has also started a leadership election and the leadership session sequence or timestamp of the polling message is earlier than the follower 1010*a* asking for consensus.

Figures 11A, 11B:
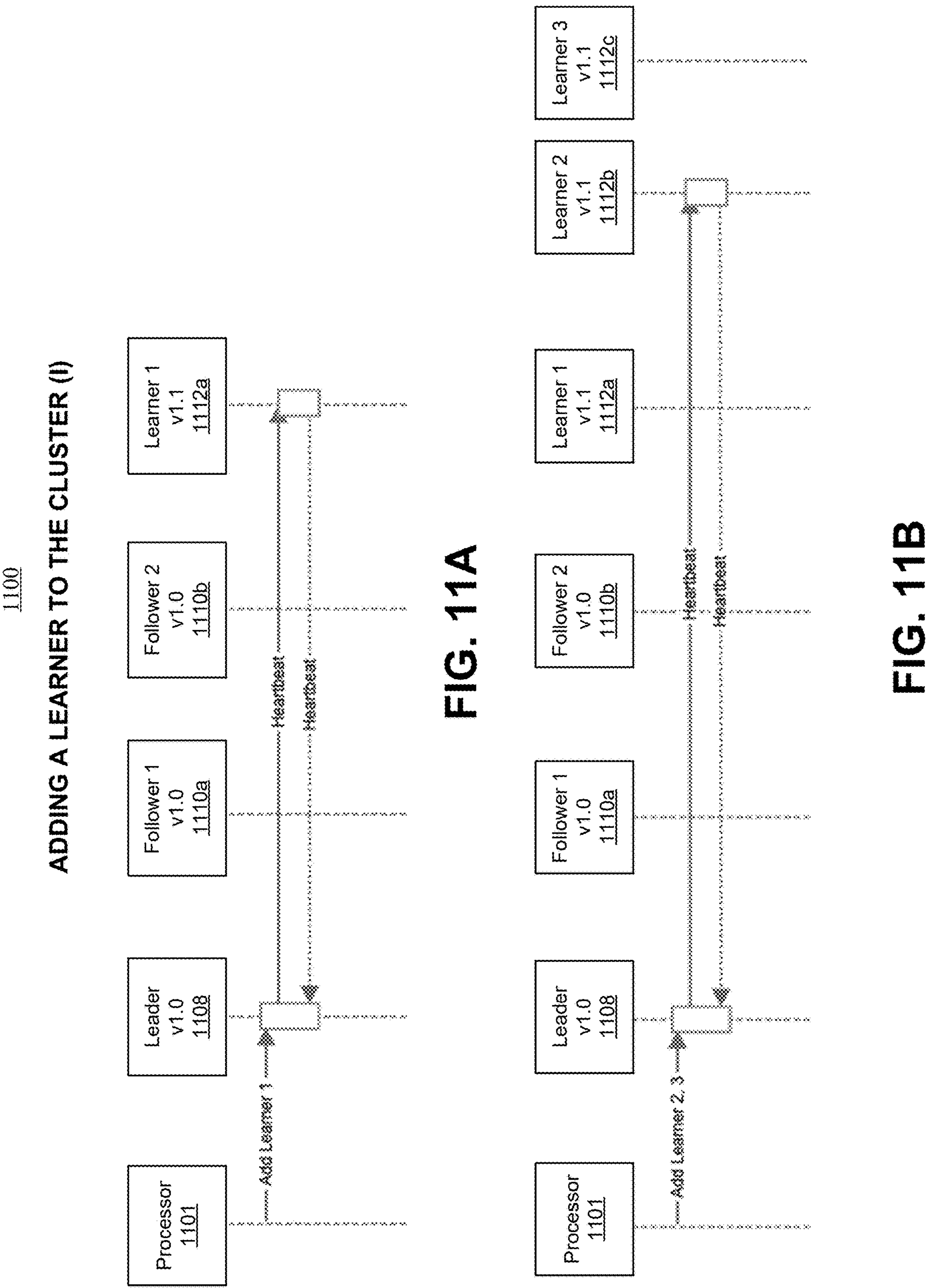
FIGS. 11A and 11B depict sequence diagrams of a learner addition sequence in an application container system according to some embodiments.
Figures 12A, 12B:
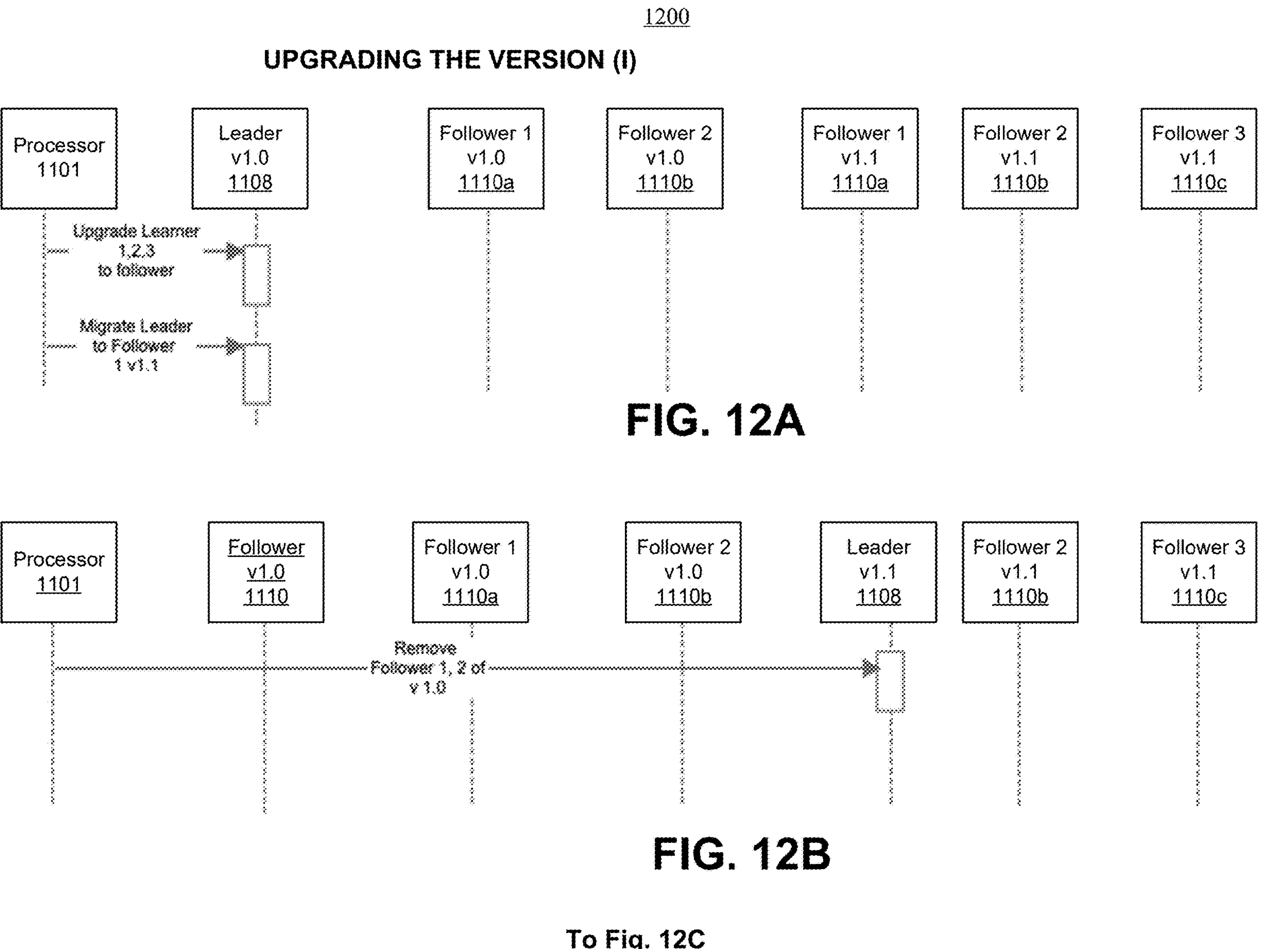

FIGS. 11A and 11B depict sequence diagrams 1100 of a learner addition sequence in an application container system according to some embodiments. FIGS. 12A, 12B, and 12C depict sequence diagrams 1200 of an upgrading version sequence in an application container system according to some embodiments.

As shown in FIGS. 11A and 11B, according to some embodiments, a resiliency processor 1101 may instantiate a leader instance 1108, a follower instance 1110*a*, a follower instance 1110*b*, and at least one learner instance 1112*a* of the containerized process in a data processing environment. The learner instance 1112*a* may comprise an instance of another transaction processing application configured to execute transactions received thereby.

In one embodiment, as shown in FIG. 11A, the leader instance 1108 may forward, prior to processing the received one or more transaction messages, a copy of the one or more transaction messages to each of the at least one learner instance 1112*a*.

In one embodiment, the other transaction processing application may be different from the transaction processing application.

In one embodiment, the transaction processing application may comprise an original version 1.0 of the transaction processing application, and the other transaction processing application may comprise a modified version 1.1 of the transaction processing application.

In one embodiment, as shown in FIG. 11B, the resiliency processor 1101 may instantiate at least two more learner instances 1112*b* and 1112*c* of the containerized process in the data processing environment. Each learner instance 1112*b* and 1112*c* may comprise the instance of the modified version 1.1 of the transaction processing application.

In one embodiment, as shown in FIGS. 12A, 12B, and 12C, a new version of the transaction processing application may have been approved by the resiliency processor 1101 from testing to be released in a live data processing environment. Further, the resiliency processor 1101 may migrate the leader instance 1108 comprising the original version 1.0 to a follower instance 1110 comprising the original version 1.0 of the transaction processing application, upgrade one of the learner instances 1112*a* comprising the modified version 1.1 to a leader instance 1108 comprising the modified version 1.1, and the other learner instances 1112*b* and 1112*c* to follower instances 1110*b* and 1110*c* comprising the modified version 1.1, and remove each of the follower instances 1110, 1110*a*, and 1110*b* comprising the original version 1.0 of the transaction processing application.

As shown in FIGS. 13-18, instances may be implemented in different deployment configurations including across multiple zones and multiple regions so as to avoid performance loss. Further, instances may be added or removed on the fly in the same or different zone and/or region to alter the resiliency tier and throughput.

FIG. 13 depicts a block diagram of a system 1300 for providing redundancy according to some embodiments. In one embodiment, the system 1300 provides a multi-zone, single region configuration. The system 1300 may include three instances: a leader instance 1308 instantiated in Zone A, a follower instance 1310*a* instantiated in Zone B, and a follower instance 1310*b* instantiated in Zone C. Zones A, B, and C may be disposed in the same region A. This configuration provides the highest performance and the lowest resiliency model. It offers multi-zonal resiliency only. In this case, 50% of 3+1=2 instances may be needed for consensus and for the cluster to be operational. Intermittent Zonal failures may be handled transparently. Therefore, only the leader instance 1308 and the follower instance 1310*a* may be needed for consensus since the follower instance 1310*a* is disposed closest geographically or logically to the leader instance 1308.

Figure 14:
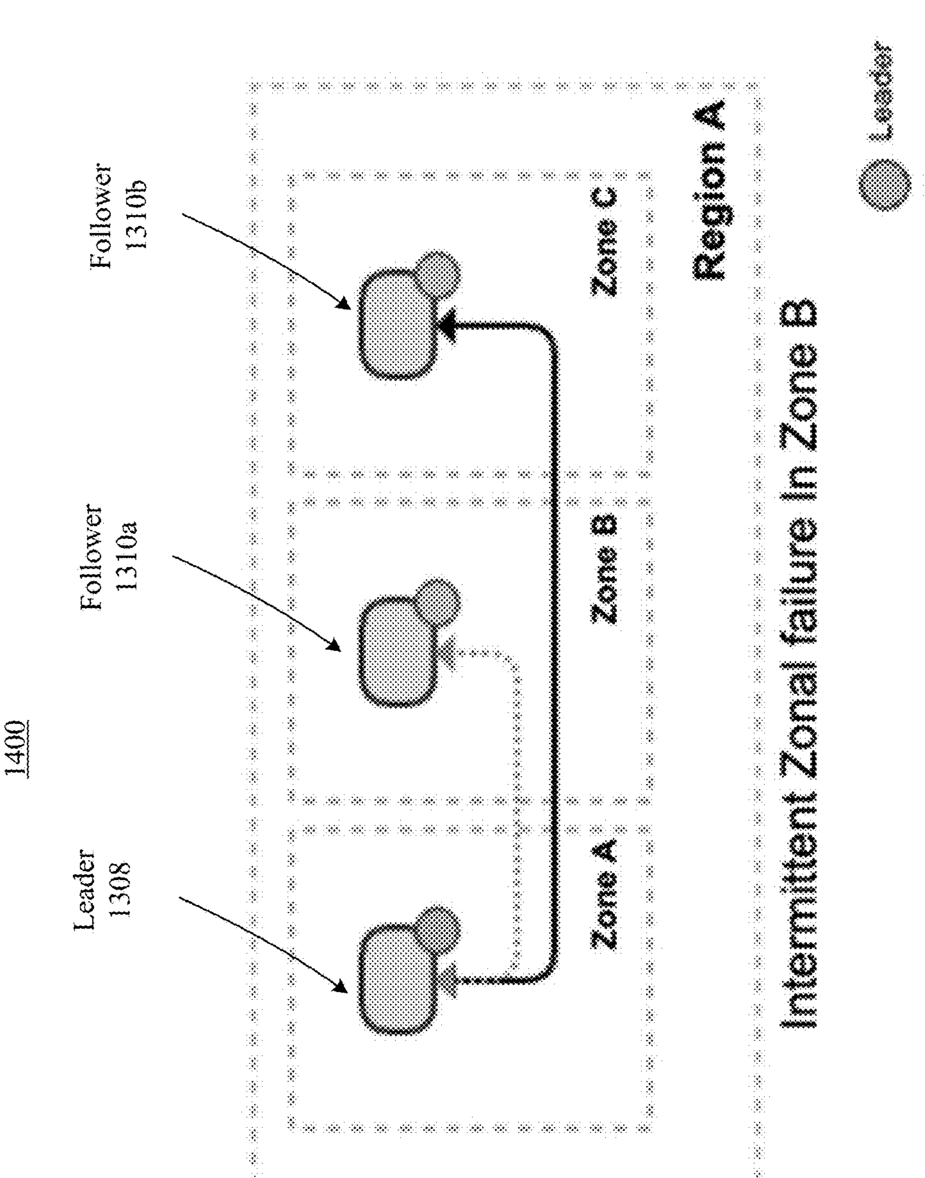
FIG. 14 depicts a block diagram of a system for providing redundancy according to some embodiments.

FIG. 14 depicts a block diagram of a system 1400 illustrating an intermittent zonal failure in the system 1300 shown in FIG. 13.

In some embodiments, an intermittent zonal failure may occur in Zone B. The intermittent zonal failure is handled transparently and the leader instance 1308 may receive acknowledgement messages from the follower instance 1310*a* and the follower instance 1310*c*. Once the intermittent zonal failure is resolved, the acknowledgement messages may again be received from the follower instance which is physically or logically closest to the learner instance 1308, e.g., the follower instance 1310*b*.

In one embodiment in which the follower instance 1310*c* was not previously instantiated and the resiliency processor determines that an intermittent zonal failure in Zone B occurred, the resiliency processor may instantiate the follower instance 1310*c* in Zone C as a replacement.

FIG. 15 depicts a block diagram of a system 1500 for providing redundancy according to some embodiments. In some embodiments, the system 1500 provides a multi-zone, multi region configuration. The system 1500 may include five instances: a leader instance 1508 instantiated in Zone A—Region A, a follower instance 1510*a* instantiated in Zone B—Region A, a follower instance 310*b* instantiated in Zone C-Region A, a follower instance 1510*c* instantiated in Zone A—Region B, and a follower instance 1510*b* instantiated in Zone B—Region B. In this case, 50% of 5+1=3 instances may be needed for consensus and for the cluster to be operational. This deployment configuration provides multi-region synchronization but single region like performance (adaptive performance) as five instances may imply a consistency partition of three. This deployment configuration further provides async replication to secondary region, e.g., Region B.

FIG. 16 depicts a block diagram of a system 1600 illustrating an intermittent zonal failure in the system 1500 shown in FIG. 15. On an intermittent Zonal failure, e.g., Zone B—Region A may fail and Region B may be automatically brought into the consensus group. Performance of Region A-Zone B may be presumed to be worse than cross region replication. If Zone B is back to normal, then the consensus group is maintained entirely in Region A again and performance improves. Through this cycle, performance and resiliency switch places in priority to adapt to the failures. The leader instance 1508 may ensure that transactions are not progressed unless consensus is attained, e.g., only upon receiving a majority of acknowledgement messages from a majority of follower instances 1510*a*, 1510*b*, 1510*c*, and 1510*d*.

Figure 17:
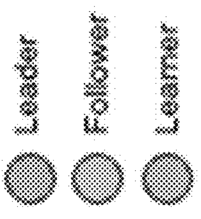
FIG. 17 depicts a block diagram of a system for providing redundancy according to some embodiments.
Figure 17:
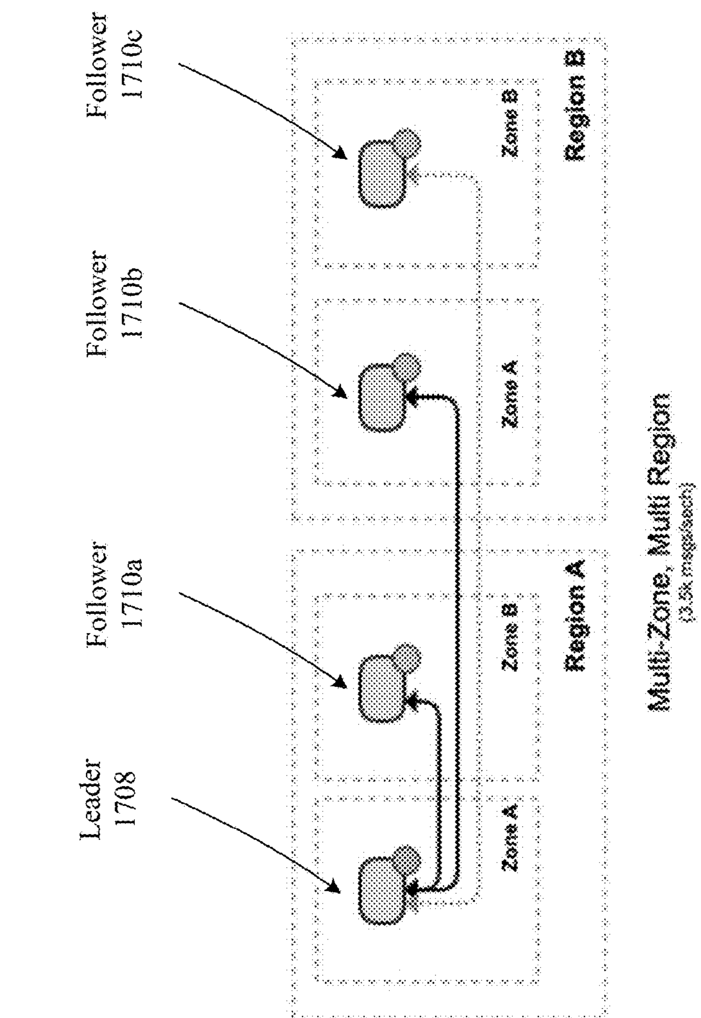

FIG. 17 depicts a block diagram of a system 1700 for providing redundancy according to some embodiments.

In some embodiments, the system 1700 provides a multi-zone, multi region configuration and provides a forced multi-region resilience. The system 1700 may include four instances: a leader instance 1708 instantiated in Zone A—Region A, a follower instance 1710*a* instantiated in Zone B—Region A, a follower instance 1710*b* instantiated in Zone A—Region B, and a follower instance 1710*c* instantiated in Zone B—Region B. In this case, 50% of 4+1=3 instances may be needed for consensus and for the cluster to be operational. Region B may be actively synchronized at all times. This deployment configuration provides high resiliency and low performance.

Figure 18:
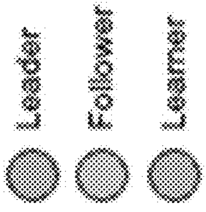
FIG. 18 depicts a block diagram of a system for providing version upgrading according to some embodiments.
Figure 18:
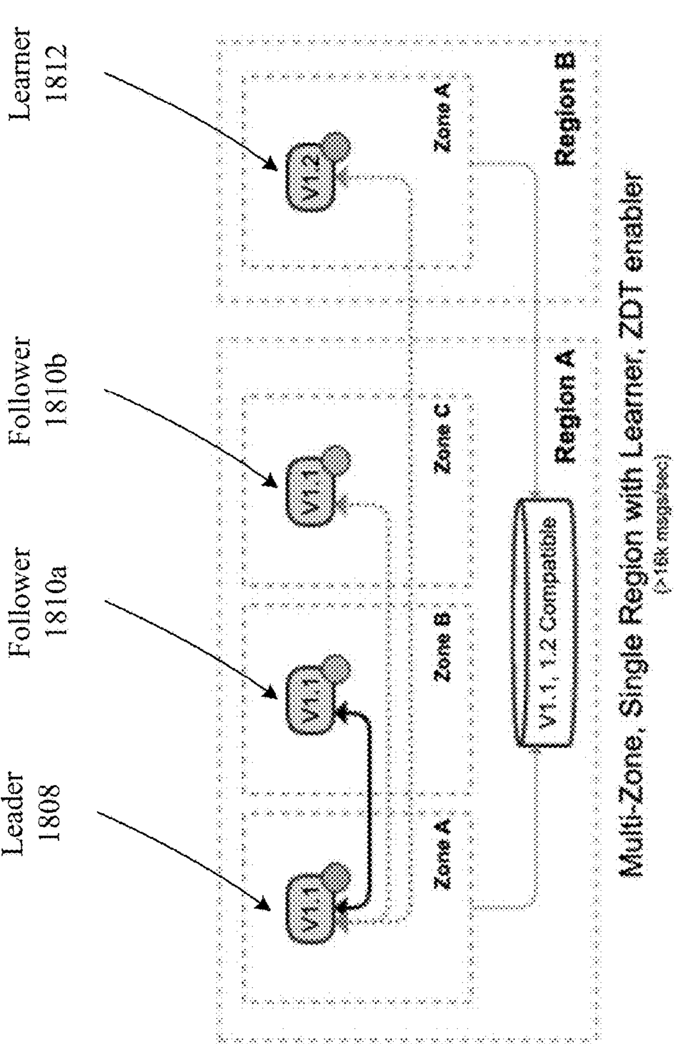

FIG. 18 depicts a block diagram of a system 1800 for providing version upgrading according to some embodiments.

In some embodiments, the system 1800 provides a multi-zone, single region with a learner instance 1812 to provide zero downtime deployment during a version upgrade. The system 1800 may instantiate a learner instance 1812 in the cluster. The system 1800 may include four instances: a leader instance 1808 v1.1 instantiated in Zone A—Region A, a follower instance 1810*a* v1.1 instantiated in Zone B—Region A, a follower instance 1810*b* v1.1. instantiated in Zone C-Region A, and a learner instance 1812 v1.2 instantiated in Zone A—Region B. In this case, 50% of 4+1=3 instances may be needed for consensus and for the cluster to be operational. Region B may be actively being synchronized at all times. This deployment configuration provides high resiliency and low performance.

The learner instance 1812 may not participate in the consensus count but may receive all production traffic asynchronously. This allows the learner instance 1812 to learn the next version (e.g., V1.2) of the application while in a production environment and to be promoted to a follower instance 1810 when the learner instance 1812 passes tests in production. Promotion may involve adding more follower instances comprising V1.2 and dropping the instances with previous version V1.1 until consensus can only be achieved by the follower instances comprising v1.2.

Figure 19:
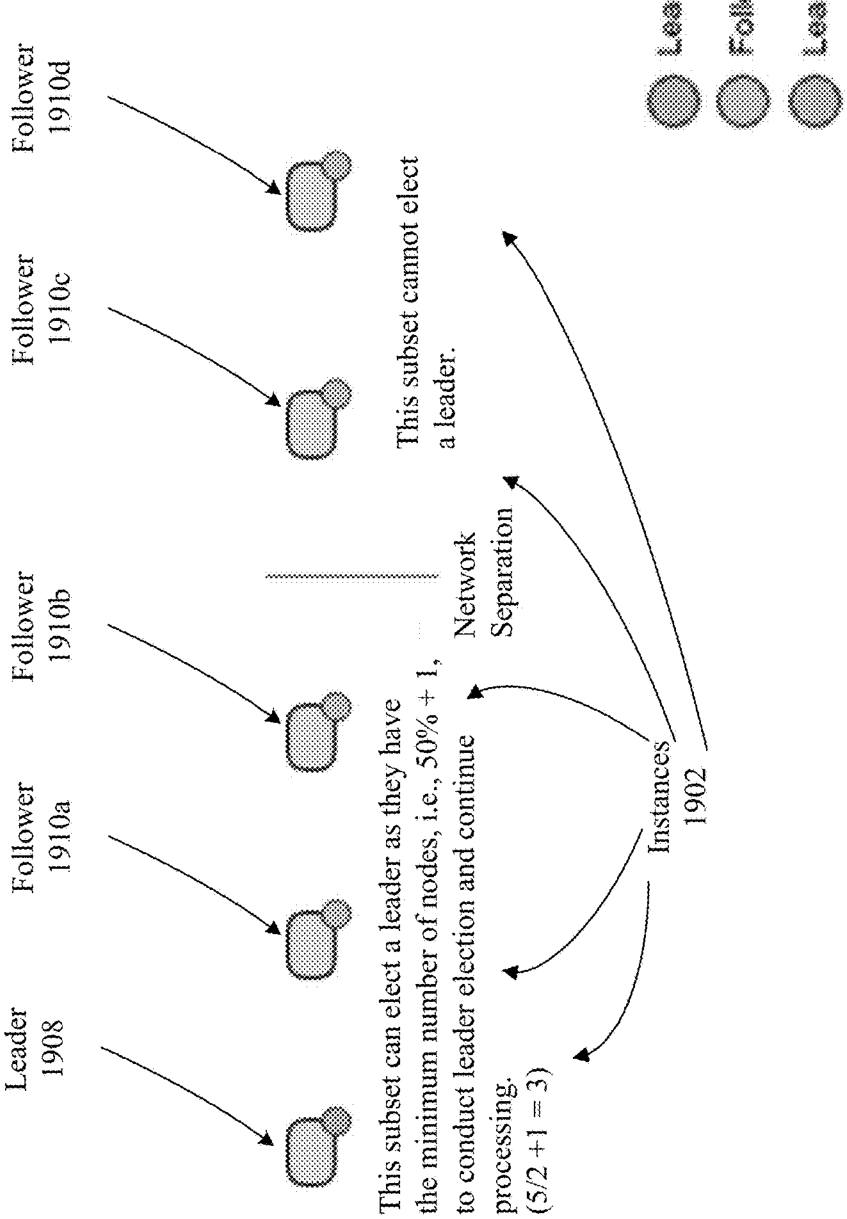
FIG. 19 depicts a block diagram of a system for providing resiliency according to some embodiments.

FIG. 19 depicts a block diagram of a system 1900 for providing resiliency according to some embodiments. In one embodiment, the configuration of the system 1900 is improved when odd number of instances 1902 including a leader instance 1908 and four follower instances 1910*a*, 1910*b*, 1910*c*, and 1910*d* are deployed. In one embodiment, a split brain scenario may take place in which the consensus cluster is split almost in half. In this situation as long as one half has the minimum number of instances to get consensus, the system 1900 can continue processing as shown. For other positive split case configurations, where the instances may be split 4 to 1, the four instances may continue. If the consensus cluster is however split into more than two clusters such as 2, 2, 1, then a non-working condition may occur and messages may queue up until some instance comes back, e.g. is instantiated by the resiliency processor to have three instances in a region.

Figure 20:
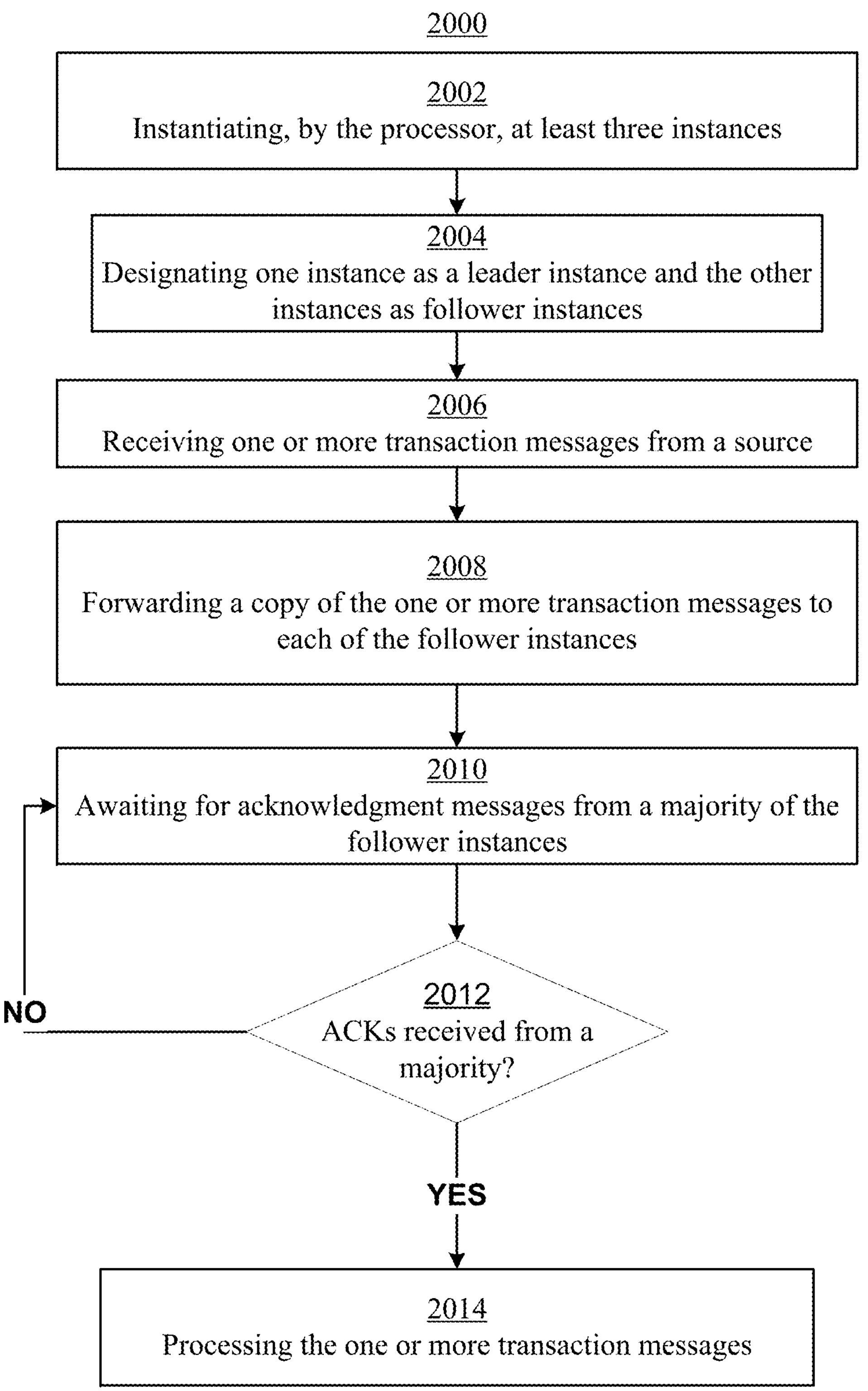
FIG. 20 depicts a flow chart showing the operation of the system of FIG. 7A.

FIG. 20 depicts an example flow chart 2000 showing the operation of the system 700A shown in FIG. 7A. In one embodiment, the operation of the system 700A may include: instantiating, by a resiliency processor 701, at least three instances of a containerized process in a data processing environment, each comprising an instance of the transaction processing application configured to execute transactions received thereby (2002), wherein each instance of the containerized process is configured to coordinate with others of the containerized processes to designate one of the instances 702 of the containerized process as a leader instance 708 and each remaining of the containerized processes as a follower instance 710 (2004); receiving, by the leader instance 708 via an electronic communications network 220 from one or more transaction message sources, one or more transaction messages to be processed thereby (2006); forwarding, by the leader instance 708 via the electronic communications network 220, prior to processing the received one or more transaction messages, a copy of the one or more transaction messages to each of the follower instances 710 (2008) and awaiting, by the leader instance 708, an acknowledgment message from a majority thereof indicative of the follower instance 710 having at least acknowledged that the one or more transaction messages will be processed by the leader instance 708 (2010); and processing, by the leader instance 708, the one or more transaction messages only upon receipt of the acknowledgment messages from a majority of the follower instances 710 (2014).

In one embodiment, the operation of the system 700A may further include instantiating two or more of the at least three instances in different computing zones of geographic region.

In one embodiment, the operation of the system 700A may further include instantiating two or more of the at least three instances in different geographic regions.

In one embodiment, the operation of the system 700A may further include determining, by the resiliency processor 701, that a failure of a follower instance 710 has occurred and, based thereon, instantiating another follower instance 710 of the containerized process as a replacement.

In one embodiment, the operation of the system 700A may further include, upon instantiating, communicating, by the other follower instance 710, with the leader instance 708 to determine if any transaction messages require sending an acknowledgment to the leader instance 708.

In one embodiment, the operation of the system 700A may further include, when the failure of the follower instance 710 prevents the leader instance 708 from receiving acknowledgment message from a majority of the follower instances 710, waiting, by the leader instance 708, for receipt of an acknowledgment message from the other follower instance once instantiated.

In one embodiment, when the communication of the acknowledgment message from each follower instance 710 to the leader instance 708 takes an amount of time dependent on a logical and/or physical distance between that follower instance and the leader instance, the operation of the system 700A may further include waiting, by the leader instance, to process the one or more transaction messages until the last acknowledgment message is received from the majority of the follower instances 710.

In one embodiment, each of the follower instances 710 are configured to, upon failure of the leader instance 708, determine which of the follower instances 710 to replace the failed leader instance 708. In particular, the operation of the system 700A may further include initiating, by a first of the follower instances 710 to determine that the leader has failed, an arbitration among of the follower instances 710 to establish the first of the follower instances 710 as the leader instance 708.

In one embodiment, the operation of the system 700A may further comprise instantiating, by the resiliency processor 701, at least one learner instance of the containerized process in a data processing environment, comprising an instance of another transaction processing application configured to execute transactions received thereby.

In one embodiment, the operation of the system 700A may further comprise forwarding, by the leader instance 708, prior to processing the received one or more transaction messages, a copy of the one or more transaction messages to each of the at least one learner instance 712.

In one embodiment, the other transaction processing application is different from the transaction processing application.

In one embodiment, the transaction processing application comprises an original version of the transaction processing application, and the other transaction processing application comprises a modified version of the transaction processing application.

In one embodiment, the operation of the system 700A may further comprise: instantiating, by the resiliency processor 701, at least two more learner instances 712 of the containerized process in the data processing environment, each comprising the instance of the modified version of transaction processing application; migrating, by the resiliency processor 701, the leader instance 708 to a follower instance comprising the original version of the transaction processing application; upgrading, by the resiliency processor 701, one of the learner instances to a leader instance 708 and the other learner instances 712 to follower instances 710; and removing, by the resiliency processor 701, each of the follower instances comprising the original version of the transaction processing application.

In one embodiment, the operation of the system 700A may further comprise: generating, by the leader instance 708, result messages indicative of the processing of the one or more transaction messages; and transmitting, by the leader instance, the result messages to a recipient 718.

In one embodiment, only the leader instance 708 is configured to transmit the result messages to the recipient 718.

Figure 21:
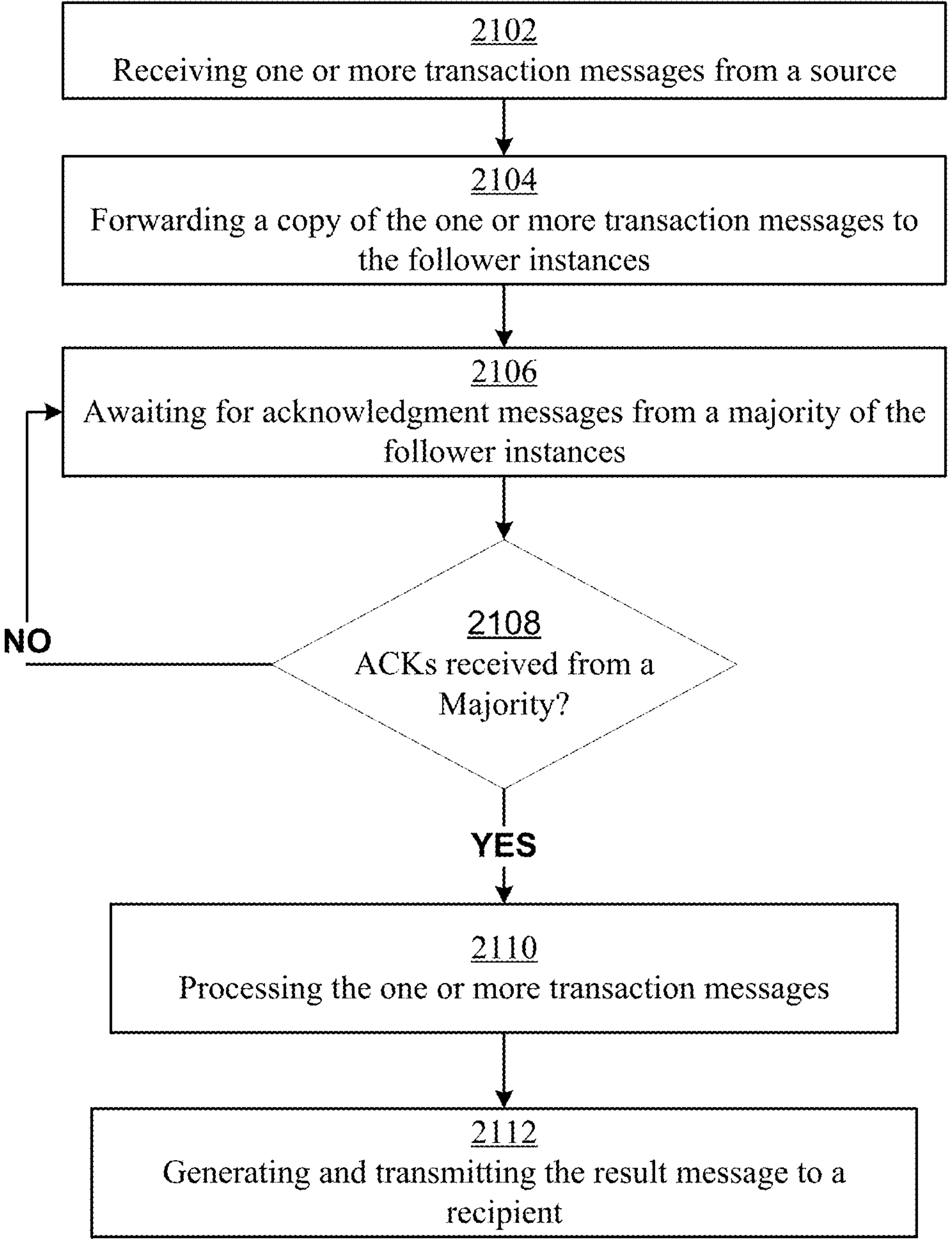
FIG. 21 depicts a flow chart showing the operation of the system of FIG. 7A.

FIG. 21 depicts a flow chart 2100 showing the operation of the system of FIG. 7A from the leader instance 708 perspective. In one embodiment, the operation of the system 700A may include: receiving, by the leader instance 708 via an electronic communications network 220 from a transaction message source 704, one or more transaction messages to be processed thereby (2102); forwarding, by the leader instance 708 via the electronic communications network, 220 prior to processing the received one or more transaction messages, a copy of the one or more transaction messages to each of the follower instances (2104) and awaiting, by the leader instance 708, an acknowledgment message from a majority thereof indicative of the follower instance 710 having at least acknowledged that the one or more transaction messages will be processed by the leader instance (2106); and processing, by the leader instance 708, the one or more transaction messages only upon receipt of the acknowledgment messages from a majority of the follower instances (2108, 2110).

In one embodiment, the operation of the system of FIG. 7A may further include generating and transmitting, by the leader instance 708, result messages indicative of the processing of the one or more transaction messages to a recipient 718 (2112).

Figure 22:
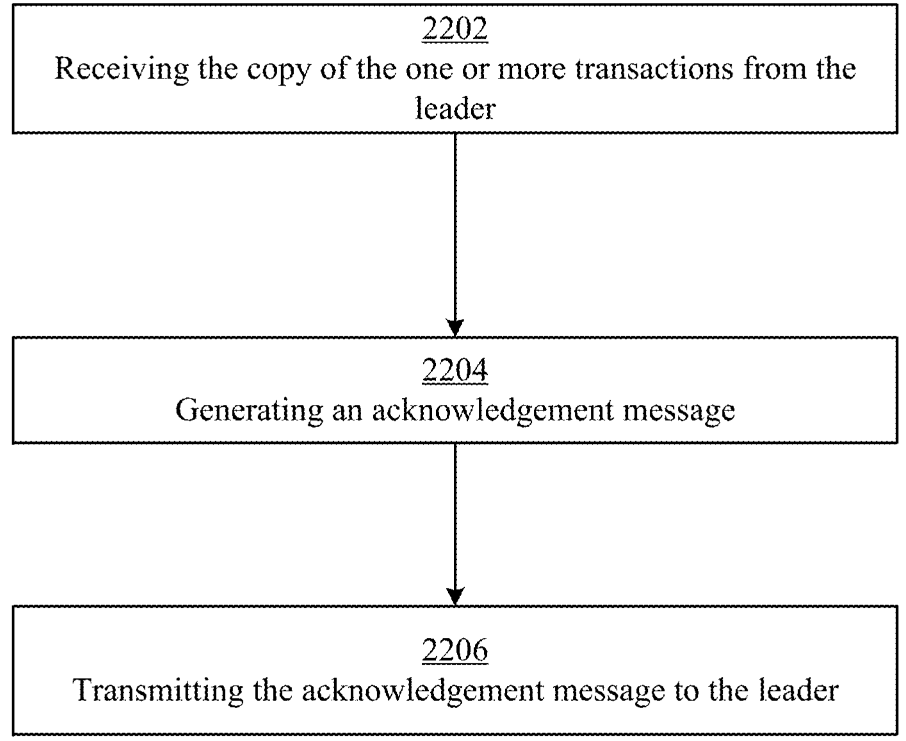
FIG. 22 depicts a flow chart showing the operation of the system of FIG. 7A.

FIG. 22 depicts a flow chart 2200 showing the operation of the system of FIG. 7A from the follower instance 710 perspective. In one embodiment, the operation of the system 700A may include: receiving, by each of the follower instances 710, via an electronic communications network 220 from the leader instance 708, a copy of one or more transaction messages (2202); generating, by each of the follower instances 710 an acknowledgment message indicative of the follower instance 710 having at least acknowledged that the one or more transaction messages will be processed by the leader instance 708 (2204); and transmitting, by each of the follower instances 710, the acknowledgement message to the leader instance 708 (2206).

Figure 23:
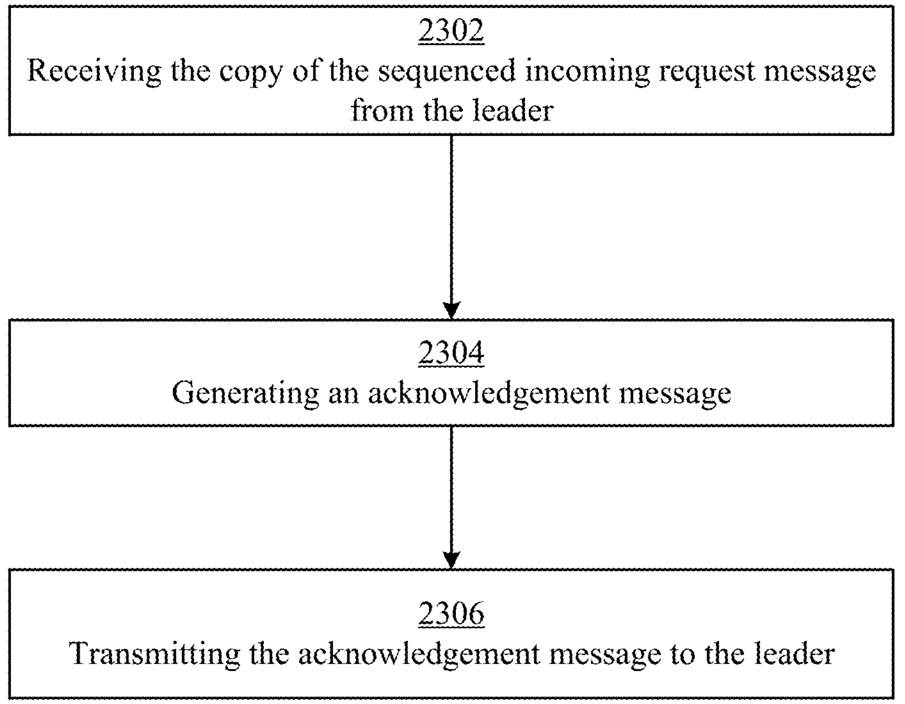
FIG. 23 depicts a flow chart showing the operation of the system of FIG. 7A.

FIG. 23 depicts a flow chart 2300 showing the operation of the system of FIG. 7A from the learner instance 712 perspective. In one embodiment, the operation of the system 700A may include: receiving, by each of the learner instances 712, via an electronic communications network 220 from the leader instance 708, a copy of one or more transaction messages (2302); generating, by each of the learner instances 712 an acknowledgment message indicative of the learner instance 712 having at least acknowledged that the one or more transaction messages will be processed by the leader instance 708 (2304); and transmitting, by each of the learner instances 712, the acknowledgement message to the leader instance 708 (2306).

CONCLUSION

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed:

1. A computer implemented method of providing redundancy to a transaction processing application, the method comprising:

instantiating, by a resiliency processor, at least three instances of a containerized process in a data processing environment, each comprising an instance of the transaction processing application configured to execute transactions received thereby, wherein each instance of the containerized process is configured to coordinate with others of the containerized processes to designate one of the instances of the containerized process as a leader instance and each of the remaining of the containerized processes as a follower instance;

receiving, by the leader instance via an electronic communications network from one or more transaction message sources, one or more transaction messages to be processed thereby;

forwarding, by the leader instance via the electronic communications network, prior to processing the received one or more transaction messages, a copy of the one or more transaction messages to each of the follower instances and awaiting, by the leader instance, an acknowledgment message from a majority thereof indicative of the follower instance having at least acknowledged that the one or more transaction messages will be processed by the leader instance; and processing, by the leader instance, the one or more transaction messages only upon receipt of the acknowledgment messages from a majority of the follower instances.

2. The method of claim 1, further comprising:

instantiating two or more of the at least three instances in different computing zones of geographic region.

3. The method of claim 1, further comprising:

instantiating two or more of the at least three instances in different geographic regions.

4. The method of claim 1, further comprising:

determining, by the resiliency processor, that a failure of a follower instance has occurred and, based thereon, instantiating another follower instance of the containerized process as a replacement.

5. The method of claim 4, further comprising:

upon instantiating, communicating, by the other follower instance, with the leader instance to determine if any transaction messages require sending an acknowledgment to the leader instance.

6. The method of claim 4, further comprising:

when the failure of the follower instance prevents the leader instance from receiving acknowledgment message from a majority of the follower instances, waiting, by the leader instance, for receipt of an acknowledgment message from the other follower instance once instantiated.

7. The method of claim 1, wherein communication of the acknowledgment message from each follower instance to the leader instance takes an amount of time dependent on a logical and/or physical distance between that follower instance and the leader instance, the method further comprising:

waiting, by the leader instance, to process the one or more transaction messages until the last acknowledgment message is received from the majority of the follower instances.

8. The method of claim 1, wherein each of the follower instances are configured to, upon failure of the leader instance, determine which of the follower instances to replace the failed leader instance, the method further comprising:

initiating, by a first of the follower instances to determine that the leader has failed, an arbitration among of the follower instances to establish the first of the follower instances as the leader instance.

9. The method of claim 1, further comprising:

instantiating, by the resiliency processor, at least one learner instance of the containerized process in a data processing environment, comprising an instance of another transaction processing application configured to execute transactions received thereby.

10. The method of claim 9, further comprising:

forwarding, by the leader instance, prior to processing the received one or more transaction messages, a copy of the one or more transaction messages to each of the at least one learner instance.

11. The method of claim 9, wherein the other transaction processing application is different from the transaction processing application.

12. The method of claim 9, wherein the other transaction processing application comprises a modified version of the transaction processing application.

13. The method of claim 12, further comprising:

instantiating, by the resiliency processor, at least 2 more learner instances of the containerized process in the data processing environment, each comprising the instance of the modified version of transaction processing application;

migrating, by the resiliency processor, the leader instance to a follower instance comprising the original version of the transaction processing application;

upgrading, by the resiliency processor, one of the learner instances to a leader instance and the other learner instances to follower instances; and removing, by the resiliency processor, each of the follower instances comprising the original version of the transaction processing application.

14. The method of claim 1, further comprising:

generating, by the leader instance, result messages indicative of the processing of the one or more transaction messages; and transmitting, by the leader instance, the result messages to a recipient, wherein only the leader instance is configured to transmit the result messages to the recipient.

15. A computer system of providing redundancy to a transaction processing application, the system comprising:

a resiliency processor and a non-transitory memory coupled therewith, the memory comprising computer executable instructions that, when executed by the resiliency processor, cause the resiliency processor to:

instantiate at least three instances of a containerized process in a data processing environment, each comprising an instance of the transaction processing application configured to execute transactions received thereby, wherein each instance of the containerized process is configured to coordinate with others of the containerized processes to designate one of the instances of the containerized process as a leader instance and each of the remaining of the containerized processes as a follower instance, and wherein the leader instance is configured to:

receive, via an electronic communications network from one or more transaction message sources, one or more transaction messages to be processed thereby;

forward, via the electronic communications network, prior to processing the received one or more transaction messages, a copy of the one or more transaction messages to each of the follower instances;

await an acknowledgment message from a majority thereof indicative of the follower instance having at least acknowledged that the one or more transaction messages will be processed by the leader instance; and process the one or more transaction messages only upon receipt of the acknowledgment messages from a majority of the follower instances.

16. The system of claim 15, wherein two or more of the at least three instances are instantiated in different computing zones of geographic region.

17. The system of claim 15, wherein two or more of the at least three instances are instantiated in different geographic regions.

18. The system of claim 15, wherein the resiliency processor is further configured to:

determine that a failure of a follower instance has occurred and, based thereon, instantiate another follower instance of the containerized process as a replacement.

19. The system of claim 18, wherein the other follower instance, upon instantiation, is configured to communicate with the leader instance to determine if any transaction messages require sending an acknowledgment to the leader instance.

20. The system of claim 18, wherein when the failure of the follower instance prevents the leader instance from receiving acknowledgment message from a majority of the follower instances, the leader instance is further configured to wait for receipt of an acknowledgment message from the other follower instance once instantiated.

21. The system of claim 15, wherein communication of the acknowledgment message from each follower instance to the leader instance takes an amount of time dependent on a logical and/or physical distance between that follower instance and the leader instance, the leader instance waiting to process the one or more transaction messages until the last acknowledgment message is received from the majority of the follower instances.

22. The system of claim 15, wherein each of the follower instances are configured to, upon failure of the leader instance, determine which of the follower instances to replace the failed leader instance, a first of the follower instances to determine that the leader has failed initiating an arbitration among of the follower instances to establish the first of the follower instances as the leader instance.

23. The system of claim 15, wherein the computer executable instructions are further executable by the resiliency processor to cause the resiliency processor to instantiate at least one learner instance of the containerized process in a data processing environment, comprising an instance of another transaction processing application configured to execute transactions received thereby.

24. The system of claim 23, wherein the leader instance is further configured to forward, prior to processing the received one or more transaction messages, a copy of the one or more transaction messages to each of the at least one learner instance.

25. The system of claim 23, wherein the other transaction processing application is different from the transaction processing application.

26. The system of claim 23, wherein the other transaction processing application comprises a modified version of the transaction processing application.

27. The system of claim 26, wherein the computer executable instructions are further executable by the resiliency processor to cause the resiliency processor to:

instantiate at least two more learner instances of the containerized process in the data processing environment, each comprising the instance of the modified version of the transaction processing application;

migrate the leader instance to a follower instance comprising the original version of the transaction processing application;

upgrade one of the learner instances to a leader instance and the other learner instances to follower instances; and remove each of the follower instances comprising the original version of the transaction processing application.

28. The system of claim 23, wherein the leader instance is further configured to:

generate result messages indicative of the processing of the one or more transaction messages; and transmit the result messages to a recipient, wherein only the leader instance is configured to transmit the result messages to the recipient.

29. A system of providing redundancy to a transaction processing application, the system comprising:

means for instantiating at least three instances of a containerized process in a data processing environment, each comprising an instance of the transaction processing application configured to execute transactions received thereby, wherein each instance of the containerized process is configured to coordinate with others of the containerized processes to designate one of the instances of the containerized process as a leader instance and each of the remaining of the containerized processes as a follower instance;

means for receiving, via an electronic communications network from one or more transaction message sources, one or more transaction messages to be processed thereby;

means for forwarding, via the electronic communications network, prior to processing the received one or more transaction messages, a copy of the one or more transaction messages to each of the follower instances and awaiting, by the leader instance, an acknowledgment message from a majority thereof indicative of the follower instance having at least acknowledged that the one or more transaction messages will be processed by the leader instance; and means for processing the one or more transaction messages only upon receipt of the acknowledgment messages from a majority of the follower instances.

* * * * *